United States Patent
Kim et al.

(10) Patent No.: US 10,251,137 B2
(45) Date of Patent: Apr. 2, 2019

(54) METHODS OF CONTROLLING TRANSMISSION POWER LEVEL BASED ON REMAINING POWER LEVEL IN IMMEDIATELY PRECEDING TIME PERIOD

(71) Applicant: Samsung Electronics Co., Ltd., Suwon-si, Gyeonggi-do (KR)

(72) Inventors: Joo-han Kim, Yongin-si (KR); Joo-hyun Do, Seoul (KR); Jung-hwa Bae, Hwaseong-si (KR); Min-goo Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/603,814

(22) Filed: May 24, 2017

(65) Prior Publication Data
US 2018/0020413 A1    Jan. 18, 2018

(30) Foreign Application Priority Data

Jul. 15, 2016 (KR) .................. 10-2016-0090271
Sep. 8, 2016 (KR) .................. 10-2016-0115713

(51) Int. Cl.
  *H04W 52/04*     (2009.01)
  *H04W 52/22*     (2009.01)
  *H04W 52/30*     (2009.01)
  *H04W 52/34*     (2009.01)
  *H04W 52/36*     (2009.01)

(52) U.S. Cl.
  CPC ....... *H04W 52/346* (2013.01); *H04W 52/225* (2013.01); *H04W 52/367* (2013.01)

(58) Field of Classification Search
  CPC ..... H04W 52/04; H04W 52/06; H04W 52/22; H04W 52/225; H04W 52/228; H04W 52/30; H04W 52/34; H04W 52/346; H04W 52/367
  USPC ........................................................ 455/522
  See application file for complete search history.

(56) References Cited

U.S. PATENT DOCUMENTS

| 8,554,259 | B2 | 10/2013 | Ramasamy et al. | |
| 8,774,853 | B2 | 7/2014 | Wilson et al. | |
| 8,805,432 | B2* | 8/2014 | Suzuki | H04W 52/225 370/328 |

(Continued)

FOREIGN PATENT DOCUMENTS

JP    2016/046601 A    4/2016

*Primary Examiner* — Philip Sobutka
(74) *Attorney, Agent, or Firm* — Harness, Dickey & Pierce, P.L.C.

(57) ABSTRACT

A method of controlling transmission power used for wireless transmission in a wireless communication device including calculating a remaining power level of a third period based on a tolerant power level of a first period and a remaining power level of a second period, the third period included in the first period and being a period from a current time to a point in time following the current time, the second period being a period from the current time to a point in time preceding the current time, calculating a transmission power level of the third period based on a target power level and the remaining power level of the third period, and generating a power control signal for determining a power level of a transmission signal unit based on the transmission power level of the third period may be provided.

19 Claims, 22 Drawing Sheets

(56) References Cited

U.S. PATENT DOCUMENTS

| | | |
|---|---|---|
| 8,811,918 B2 | 8/2014 | Rath et al. |
| 9,253,733 B1 | 2/2016 | Lee et al. |
| 9,287,953 B2 | 3/2016 | Ngai et al. |
| 9,295,004 B2 | 3/2016 | Gopalakrishnan et al. |
| 9,307,499 B2 | 4/2016 | Zehr et al. |
| 2010/0273518 A1* | 10/2010 | Suzuki ............... H04W 52/225 455/522 |
| 2012/0021707 A1 | 1/2012 | Forrester et al. |
| 2013/0077522 A1* | 3/2013 | Iyama ............... H04W 52/225 370/252 |
| 2014/0115692 A1 | 4/2014 | Lee |
| 2015/0323472 A1 | 11/2015 | Lee et al. |
| 2015/0341869 A1* | 11/2015 | Sen ................... H04W 52/34 455/522 |

* cited by examiner

METHODS OF CONTROLLING TRANSMISSION POWER LEVEL BASED ON REMAINING POWER LEVEL IN IMMEDIATELY PRECEDING TIME PERIOD

CROSS-REFERENCE TO RELATED APPLICATIONS

This application claims priority to Korean Patent Application No. 10-2016-0090271, filed on Jul. 15, 2016, and Korean Patent Application No. 10-2016-0115713, filed on Sep. 8, 2016, in the Korean Intellectual Property Office, the disclosures of which are incorporated herein in their entireties by reference.

BACKGROUND

The inventive concepts relate to wireless communication, and more particularly, to a devices and/or methods of controlling transmission power.

In a wireless communication system, radio frequency (RF) signal transmission between a base station (for example, a node B) and user equipment (UE) is easily affected by path loss, shadow fading, and/or the like, and thus the base station and the UE need to be controlled to have appropriate transmission power in order for quality of service (QoS) not to be degraded. UE, which is a wireless communication device, may output an RF signal according to transmission power for transmission of a signal, and a user of the UE may be exposed to an RF electromagnetic field by the RF signal. Energy which the user absorbs from the RF electromagnetic field may increase as the transmission power increases.

SUMMARY

Some example embodiments of the inventive concepts provide methods and/or a device, which control transmission power used for wireless transmission in a wireless communication device, based on energy absorbed by a user.

According to an aspect of the inventive concepts, there is provided a method of controlling transmission power used for wireless transmission in a wireless communication device may include calculating a remaining power level of a third period based on a tolerant power level of a first period and a remaining power level of a second period, the third period included in the first period and being a period from a current time to a point in time following the current time, the second period being a period from the current time to a point in time preceding the current time, calculating a transmission power level of the third period based on a target power level and the remaining power level of the third period, and generating a power control signal for determining a power level of a transmission signal unit based on the transmission power level of the third period may be provided According to another aspect of the inventive concepts, a method of controlling transmission power used for wireless transmission in a wireless communication device may include calculating, by a controller, remaining emission energy of a third period based on tolerant emission energy of a first period and used energy which was emitted for the wireless transmission during a second period, the third period included in the first period and being a period from a current time to a point in time following the current time, the second period being from the current time to a point in time preceding the current time, calculating, by the controller, a transmission power level of the third period based on the remaining emission energy of the third period and a target power level of the third period, and generating, by the controller, a power control signal for controlling a power level of a transmission signal unit based on the transmission power level.

According to an aspect of the inventive concepts, there is provided a method of controlling transmission power used for wireless transmission in a wireless communication device may include calculating, by a controller, a remaining power level of a third period based on a tolerant power level of a first period and a remaining power level of a second period, the third period included in the first period and being a period from a current time to a point in time following the current time, the second period being a period from the current time to a point in time preceding the current time, calculating, by the controller, a transmission power level of the third period based on a target power level of the third period and the remaining power level of the third period, and generating, by the controller, a power control signal for controlling a power level of a transmission signal unit based on the transmission power level of the third period.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
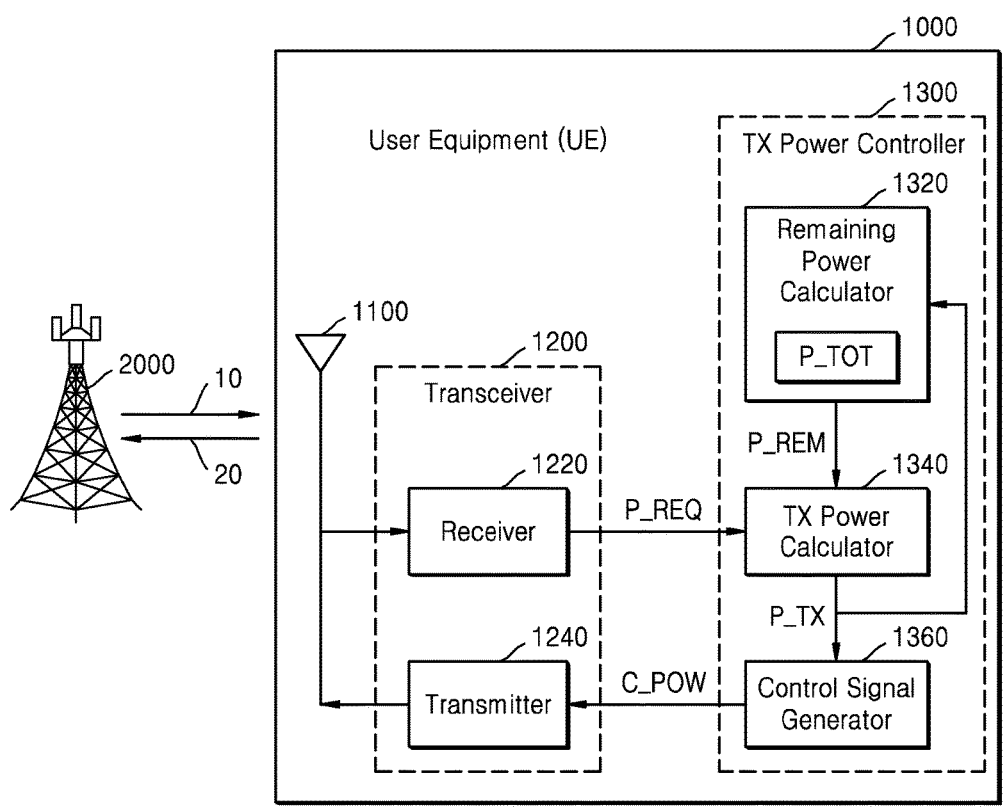
FIG. 1 is a block diagram illustrating an example of a wireless communication system using a transmission power control method according to an example embodiment.

FIG. 1 is a block diagram illustrating an example of a wireless communication system using a transmission power control method, according to an example embodiment. As illustrated in FIG. 1, user equipment (UE) 1000 and a base station 2000 may communicate with each other through a downlink channel 10 and an uplink channel 20.

The UE 1000, a wireless communication device, may be fixed or may be mobile. The UE 1000 may denote various devices which have a capability to communicate with the base station 200 to transmit or receive data and/or control information. For example, the UE 1000 may be referred to as terminal equipment, a mobile station (MS), a mobile terminal (MT), a user terminal (UT), a subscribe station (SS), a wireless device, or a handheld device. The base station 2000 may denote a fixed station which communicates with UE and/or another base station. Thus, the base station 2000 may communicate with UE and/or another base station to exchange data and control information therewith. For example, the base station 2000 may be referred to as a node B, an evolved-node B (eNB), a base transceiver system (BTS), or an access point (AP).

A wireless communication network between the UE 1000 and the base station 2000 may share available network resources to support communication between users. For example, in the wireless communication network, information may be transferred by various communication schemes such as code division multiple access (CDMA), frequency division multiple access (FDMA), time division multiple access (TDMA), orthogonal frequency division multiple access (OFDMA), or single carrier frequency division multiple access (SC-FDMA).

Transmission power of the UE 1000 may be controlled by a transmit power control (TPC) command, which is transmitted from the base station 2000 to the UE 1000 through the downlink channel 10. For example, the base station 2000 may transmit the TPC command to the UE 1000 based on an estimated signal-to-interference ratio (SIR) a target SIR. The UE 100 may transmit the estimated SIR appropriate for maintaining an SIR of an RF signal. The UE 1000 may control (e.g., increase, decrease, or maintain) powers of RF signals to be transmitted to the base station 2000 through the uplink channel 20, based on the transmitted TPC command.

The transmission power of the UE 1000 may be associated with energy emitted from the UE 1000, as well as power consumption of the UE 1000. That is, in a case that the UE 1000 generates RF signals to have relatively high transmission power that generate a relatively strong electromagnetic field, a user exposed to an electromagnetic field may absorb the energy from the UE 1000. A specific absorption rate (SAR) may denote an absorption rate of energy by a human body when exposed to an RF electromagnetic field. An SAR by an electronic device may be restricted not to exceed a certain level, and in wireless communication devices such as the UE 1000, an SAR may be controlled by adjusting transmission power. However, transmission power is closely associated with the QoS of the UE 1000 and the base station 2000, and thus may be controlled based on both an SAR and QoS. For example, devices (e.g., a transmission power controller 1300 of FIG. 1) and/or methods of controlling transmission power according to an example embodiment should satisfy a limit of an SAR and maintain transmission power sufficient to maintain QoS.

Referring to FIG. 1, the UE 1000 may include an antenna 1100, a transceiver 1200, and a transmission power controller 1300. The transceiver 1200 may include a receiver 1220 and a transmitter 1240, and the transmission power controller 1300 may include a remaining power calculator 1320, a transmission power calculator 1340, and a control signal generator 1360. Herein, the transmission power controller 1300 may be referred to as a transmission power control device. Each of the elements included in the UE 1000 may be a hardware block including an analog circuit and/or a digital circuit, or may be a software block including a plurality of instructions executed by a processor or the like.

The receiver 1220 of the transceiver 1200 may receive RF signals from the base station 2000 through the antenna 1100 and may extract a TPC command from each of the received RF signals. For example, the receiver 1220 may include a demodulator and a decoder, and may demodulate and decode the RF signals received through the antenna 1100 to extract the TPC command. Also, the receiver 1220 may generate a request power level P_REQ representing the transmission power of the UE 1000 requested by the base station 2000 according to the extracted TPC command. In some example embodiments, the receiver 1220 may output the extracted TPC command, and the request power level P_REQ may be generated from the TPC command by a device (e.g., the transmission power controller 1300) outside the receiver 1220.

The transmitter 1240 of the transceiver 1200 may receive a power control signal C_POW from the transmission power controller 1300 and may control power of an RF signal output through the antenna 1100 according to the power control signal C_POW. That is, the transceiver 1200 may differently control a power level (e.g., transmission (TX) power) at every transmission unit, in response to the power control signal C_POW. For example, a transmission unit of long term evolution (LTE) may have a length of 1 ms corresponding to one subframe, and a transmission unit of each of wideband code division multiple access (WCDMA) and high speed downlink packet access (HSDPA) may have a length of 0.667 ms corresponding to one slot.

The transceiver 1200 may form a beam (e.g., a beam used in LTE and mmWave) in the antenna 1100. For example, the antenna 1100 may be a multiple antenna including a plurality of antennas, and the transceiver 1200 may control phases of RF signals respectively output from the antennas to form the beam. Even in a case where the antenna 1100 is a single antenna, the beam may be formed, and the transceiver 1200 may control a type of the beam formed in the antenna 1100. As described below with reference to FIGS. 5 and 15, the beam formed in the antenna 1100 may be closely associated with an SAR. Thus, the UE 1000 may control transmission power or may modify the type of the beam, based on the beam formed in the antenna 1100.

The remaining power calculator 1320 of the transmission power controller 1300, as illustrated in FIG. 1, may include a tolerant power level P_TOT. For example, the remaining power calculator 1320 may include a storage space (e.g., a memory or a register), which stores the tolerant power level P_TOT. The tolerant power level P_TOT may be determined based on a limit of an SAR of the UE 1000. For example, as described below with reference to FIG. 2, the tolerant power level P_TOT may denote a total transmission power level which is available to the UE 1000 for wireless transmission during a certain period so as to satisfy a limit of an SAR.

The remaining power calculator 1320 may receive a transmission power level P_TX from the transmission power calculator 1340 and may calculate and output a remaining power level P_REM, based on the tolerant power level P_TOT and the transmission power level P_TX. The remaining power level P_REM may denote a transmission power level, which is available to the UE 1000 for wireless transmission during a certain period from the current time to a point in time in the future. Details of an operation of the remaining power calculator 1320 will be described below with reference to FIGS. 3A, 3B and 4.

The transmission power calculator 1340 may receive the remaining power level P_REM from the remaining power calculator 1320 and may receive the request power level P_REQ from the receiver 1220 of the transceiver 1200. The transmission power calculator 1340 may calculate and output the transmission power level P_TX, based on the remaining power level P_REM and the request power level P_REQ. For example, the transmission power calculator 1340 may output the transmission power level P_TX equal to the request power level P_REQ according to the remaining power level P_REM or may output the transmission power level P_TX which is lower than the request power level P_REQ based on an SAR. Details of an operation of the transmission power calculator 1340 will be described below with reference to FIGS. 7 to 13.

The control signal generator 1360 may receive the transmission power level P_TX from the transmission power calculator 1340 and may generate the power control signal C_POW based on the transmission power level P_TX. For example, the transmission power level P_TX output from the transmission power calculator 1340 may correspond to one transmission unit or may correspond to a series of transmission units. As described above, the transmitter 1240 of the transceiver 1200 may control transmission power based on a transmission unit in response to the power control signal C_POW. Therefore, if the transmission power level P_TX corresponds to one transmission unit, the control signal generator 1360 may generate one power control signal C_POW according to the transmission power level P_TX. If the transmission power level P_TX corresponds to a series of transmission units, the control signal generator 1360 may generate a series of power control signals C_POW, based on the transmission power level P_TX.

Details of an operation of the control signal generator 1360 will be described below with reference to FIG. 14.

In a case of controlling transmission power for wireless transmission in a wireless communication device in consideration of an SAR, if a reduction amount of transmission power is low, a limit of the SAR may not be satisfied, and if the reduction amount of the transmission power is excessively high, QoS may be degraded. If a variation amount of the transmission power is fixed to a certain amount, a level of the transmission power may be increased and decreased unnecessarily and repeatedly. However, as described above, the transmission power controller 1300 according to an example embodiment may calculate the remaining power level P_REM based on the tolerant power level P_TOT and the transmission power level P_TX, which are determined based on the limit of the SAR, and may determine the transmission power level P_TX based on the remaining power level P_REM. Therefore, the QoS of wireless transmission may be maintained, and further, energy emitted during a certain period may be limited. Also, the limit of the SAR is satisfied, and moreover, the transmission power is maintained at a sufficient level.

Figure 2:
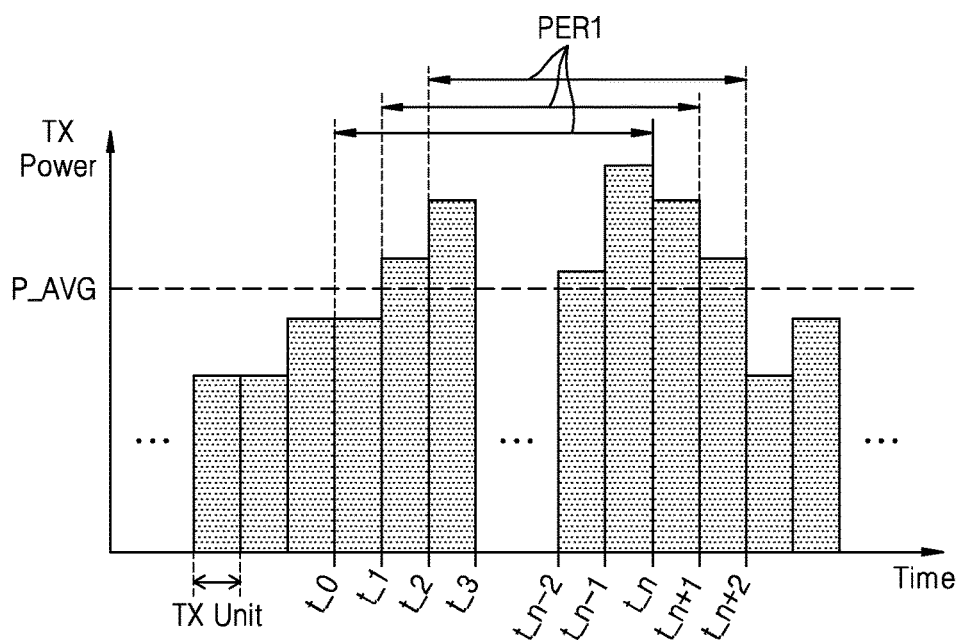
FIG. 2 shows transmission power levels used in a transmission unit with respect to time according to an example embodiment.

FIG. 2 shows transmission power levels used in a transmission unit with respect to time according to an example embodiment. As described above with reference to FIG. 1, different power levels may be applied for individual transmission units (e.g., individual subframes in LTE), respectively. Also, the tolerant power level P_TOT may denote a total transmission power level which is available to a wireless communication device (e.g., the UE 1000 of FIG. 1) during a certain period so as to satisfy a limit of an SAR.

Referring to FIG. 2, a first period PER1 may have a length corresponding to n number of transmission units (collectively referred to as a TX unit), and a tolerant power level $P\_TOT_{PER1}$ may denote a maximum total transmission power level which is available to the UE 1000 for wireless transmission during the first period PER1 so as to satisfy a limit SAR $SAR_{limit}$, namely, may denote a sum of power levels (TX power) of the transmission units (TX unit). As shown in FIG. 2, the tolerant power level $P\_TOT_{PER1}$ may be expressed as $f(SAR_{limit})$ (e.g., a function of the limit SAR $SAR_{limit}$). An SAR may be determined based on various factors, for example, a distance between a user and a wireless communication device, and/or a source that generates energy emitted from the wireless communication device. The a function "f" of FIG. 2 may further include one or more additional parameters in addition to the limit SAR $SAR_{limit}$.

If a sum of transmission power levels which are used by a wireless communication device (e.g., the UE 1000 of FIG. 1) in a transmission unit during the first period PER1 satisfies the tolerant power level $P\_TOT_{PER1}$ (e.g., equal to or less than the tolerant power level $P\_TOT_{PER1}$), an SAR by the wireless communication device may satisfy the limit SAR $SAR_{limit}$ (e.g., may be equal to or less than the limit SAR $SAR_{limit}$). An average power level P_AVG may be defined by dividing the tolerant power level $P\_TOT_{PER1}$ by n, which is the number of transmission units included in the first period PER1, and if an average of transmission power levels satisfies the average power level P_AVG (e.g., equal to or less than the average power level P_AVG) in the first period PER1, the SAR by the wireless communication device may satisfy the limit SAR $SAR_{limit}$. That is, the tolerant power level P_TOT included in the remaining power calculator 1320 of FIG. 1 may be the tolerant power level $P\_TOT_{PER1}$ of the first period PER1.

The wireless communication device may be desired to satisfy the tolerant power level $P\_TOT_{PER1}$ in the first period PER1. For example, the wireless communication device may be desired to allow each of sums of transmission power levels from t_0 to t_n, from t_1 to t_n−1, and from t_2 to t_n+2 to be equal to or less than the tolerant power level $P\_TOT_{PER1}$. That is, the wireless communication device may receive a request for allowing a sum of transmission power levels, included in a moving window of which a width is the period PER1, to be equal to or less than the tolerant power level $P\_TOT_{PER1}$. As described below, the transmission power control device and method according to an example embodiment may calculate a remaining power level based on a power level used for wireless transmission and the tolerant power level $P\_TOT_{PER1}$ of the first period PER1, thereby controlling transmission power so as to satisfy the limit SAR $SAR_{limit}$. For example, as shown in FIG. 2, a remaining power level $P\_REM_{PER1}$ of the first period PER1 may be calculated as a sum of differences between the average power level P_AVG and power levels (TX power) of the transmission units (TX unit) (i.e., $P\_REM_{PER1} = \Sigma_{PER1}(P\_AVG - TX\ Power)$), and transmission power may be controlled in order for the remaining power level $P\_REM_{PER1}$ of the first period PER1 to be equal to or greater than zero (i.e., $P\_REM_{PER1} \geq 0$).

Figure 3A:
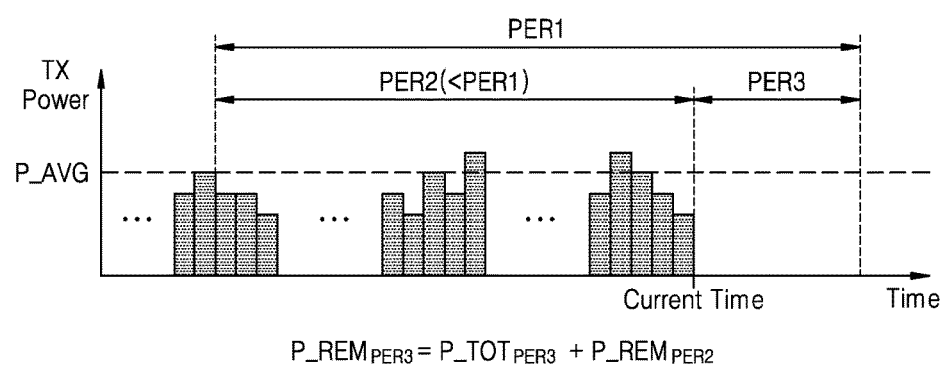
FIGS. 3A and 3B are diagrams showing examples of calculating a remaining power level according to an example embodiment.
Figure 3B:
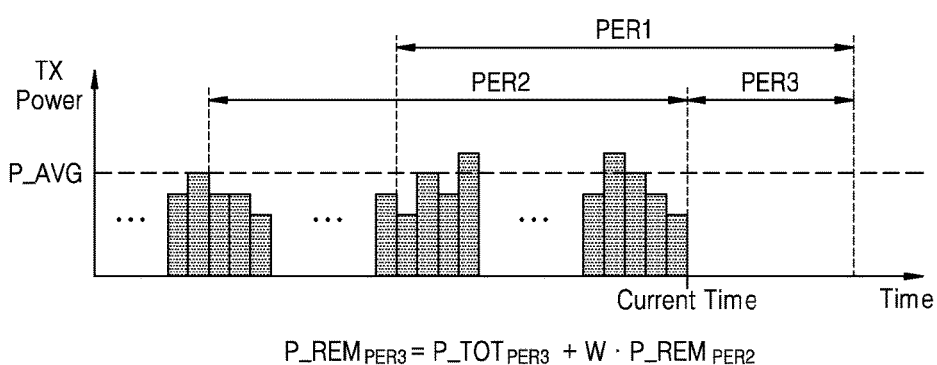

FIGS. 3A and 3B are diagrams showing examples of calculating a remaining power level according to an example embodiment. As described above with reference to FIG. 1, the remaining power calculator 1320 of the transmission power controller 1300 may calculate the remaining power level P_REM based on the tolerant power level P_TOT and the transmission power level P_TX.

Referring to FIGS. 3A and 3B, a second period PER2 may be a period from a certain time of the past to the current time included in the first period PER1, and a third period PER3 may be a period from the current time included in the first period PER1 to a certain time of the future. A remaining power level $P\_REM_{PER3}$ of the third period PER3 may be calculated based on a tolerant power level $P\_TOT_{PER3}$ of the third period PER3 and a remaining power level $P\_REM_{PER2}$ of the second period PER2. For example, the tolerant power level $P\_TOT_{PER3}$ of the third period PER3 may be calculated from the tolerant power level $P\_TOT_{PER1}$ of the first period PER1, based on a ratio of the first period PER1 to the third period PER3, and the remaining power level $P\_REM_{PER3}$ of the third period PER3 may be calculated based on the tolerant power level $P\_TOT_{PER3}$ of the third period PER3 and the remaining power level $P\_REM_{PER2}$ of the second period PER2. That is, a remaining power level $P\_REM_{PER3}$ of a third period PER3 from the current time to a point in time in the future may vary based on a remaining power level $P\_REM_{PER2}$ of a second period PER2 from the current time to a point in time in the past. For example, the transmission power controller 1300 of FIG. 1 may calculate the remaining power level $P\_REM_{PER2}$ of the second period PER2 and may calculate the remaining power level $P\_REM_{PER3}$ of the third period PER3 from the remaining power level $P\_REM_{PER2}$ of the second period PER2, and output the calculated remaining power level $P\_REM_{PER3}$ as a remaining power level P_REM. That is, the remaining power level P_REM output from the transmission power controller 1300 of FIG. 1 may be the remaining power level $P\_REM_{PER3}$ of the third period PER3. A transmission power level to be used during the third period PER3 may be calculated (e.g., by the transmission power calculator 1340 of FIG. 1) by calculating the remaining power level $P\_REM_{PER3}$ of the third period PER3.

Referring to FIG. 3A, the first period PER1 may be equal to a sum of the second period PER2 and the third period PER3. Therefore, the remaining power level $P\_REM_{PER3}$ of the third period PER3 may be equal to a sum of the tolerant power level $P\_TOT_{PER3}$ of the third period PER3 and the remaining power level $P\_REM_{PER2}$ of the second period PER2. That is, the remaining power level $P\_REM_{PER3}$ of the third period PER3 may be expressed as the following Equation (1):

$$P\_REM_{PER3} = P\_TOT_{PER3} + P\_REM_{PER2} \qquad (1)$$

As wireless transmission is continuously performed, the first to third periods PER1 to PER3 may move, and thus the remaining power level $P\_REM_{PER2}$ of the second period PER2 may be referred to as a moving sum of remaining power levels of the second period PER2. The remaining power level $P\_REM_{PER2}$ of the second period PER2 may be calculated from the tolerant power level $P\_TOT_{PER1}$ of the first period PER1 and a transmission power level P_TX. For example, as described above with reference to FIG. 2, the average power level P_AVG may be calculated from the tolerant power level $P\_TOT_{PER1}$ of the first period PER1, and the remaining power level $P\_REM_{PER2}$ of the second period PER2 may be calculated by summating differences between the average power level P_AVG and transmission power levels P_TX included in the second period PER2 (e.g., $P\_REM_{PER2} = \Sigma_{PER2}(P\_AVG - P\_TX)$).

Referring to FIG. 3B, a sum of the second period PER2 and the third period PER3 may be greater than the first period PER1. That is, a power level of a transmission unit previous to the first period PER1 may be used to calculate the remaining power level $P\_REM_{PER3}$ of the third period PER3. Therefore, as shown in FIG. 3B, the remaining power level $P\_REM_{PER3}$ of the third period PER3 may be a sum of the remaining power level $P\_REM_{PER2}$ of the second period PER2 and the tolerant power level $P\_TOT_{PER3}$ of the third period PER3 that is adjusted by a weight value. That is, the remaining power level $P\_REM_{PER3}$ of the third period PER3 may be expressed as the following Equation (2):

$$P\_REM_{PER3} = P\_TOT_{PER3} + W \cdot P\_REM_{PER2} \qquad (2)$$

In Equation (2), a weight value "W" may be determined based on lengths of the first to third periods PER1 to PER3. For example, if each of the first period PER1 and the second period PER2 has a length corresponding to 1,000 transmission units and the third period PER3 has a length corresponding to one transmission unit, the weight value "W" may be "999/1,000".

According to an example embodiment, the remaining power level $P\_REM_{PER2}$ of the second period PER2 may be a value generated by filtering remaining power levels included in the second period PER2. For example, the remaining power calculator 1320 of FIG. 1 may include a finite impulse response (FIR) filter or an infinite impulse response (IIR) filter, and the remaining power level $P\_REM_{PER2}$ of the second period PER2 may be a value generated by passing remaining power levels through a digital filter.

According to an example embodiment, the remaining power level $P\_REM_{PER2}$ of the second period PER2 shown in FIGS. 3A and 3B may be calculated by using a moving average. For example, the remaining power level $P\_REM_{PER2}$ of the second period PER2 may be calculated by multiplying the moving average, calculated based on a cumulative moving average or an exponential moving average of the remaining power levels included in the second period PER2, and the number of transmission units (or transmission power levels) included in the second period PER2. In this manner, in a case where the remaining power level $P\_REM_{PER2}$ of the second period PER2 is calculated by using the cumulative moving average or the exponential moving average, a previous remaining power level $P\_REM_{PER2}$ and an added remaining power level may be used for calculating a remaining power level $P\_REM_{PER2}$ of a new second period PER2 without using all remaining power levels which have been used during the second period PER2, and thus, a storage space for calculating the remaining power level $P\_REM_{PER2}$ is saved.

Figure 4:
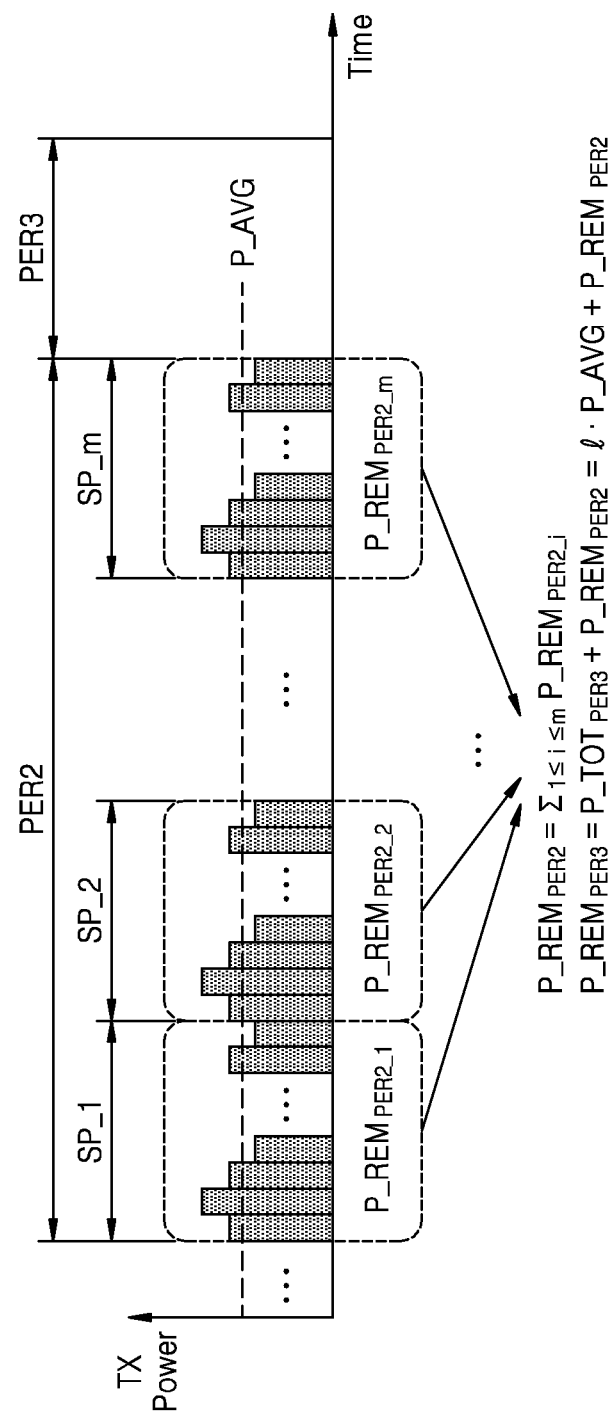
FIG. 4 shows an example of calculating a remaining power level by dividing a second period of FIGS. 3A and 3B into a plurality of sub-periods according to an example embodiment.

FIG. 4 shows an example of calculating a remaining power level by dividing a second period of FIGS. 3A and 3B into a plurality of sub-periods according to an example embodiment. As described above with reference to FIGS. 3A and 3B, the remaining power level $P\_REM_{PER2}$ of the second period PER2 may be calculated from remaining power levels included in the second period PER2.

Referring to FIG. 4, a plurality of partial remaining power levels $P\_REM_{PER2\_1}$ to $P\_REM_{PER2\_m}$ of a plurality of sub-periods SP_1 to SP_m may be calculated. As shown in FIG. 4, a partial remaining power level may be calculated by accumulating differences between an average power level P_AVG and transmission power levels included in a sub-period. In this manner, the calculated partial remaining power level may have a positive value or a negative value. A remaining power level $P\_REM_{PER2}$ of a second period PER2 may be a sum of the partial remaining power levels $P\_REM_{PER2\_1}$ to $P\_REM_{PER2\_m}$. By using the remaining power level $P\_REM_{PER2}$ of the second period PER2 and the average power level P_AVG, a remaining power level $P\_REM_{PER3}$ of a third period PER3 may be calculated as expressed in the following Equation (3):

$$P\_REM_{PER3} = P\_TOT_{PER3} + P\_REM_{PER2} = l \cdot P\_AVG + P\_REM_{PER2} \quad (3)$$

where l may denote the number of transmission units included in the third period PER3.

Therefore, the partial remaining power levels $P\_REM_{PER2\_1}$ to $P\_REM_{PER2\_m}$ may be stored for calculating the remaining power level $P\_REM_{PER2}$ of the second period PER2 instead of storing all remaining power levels of the second period PER2, and thus, a storage space for calculating the remaining power level $P\_REM_{PER2}$ is saved. For example, if the second period PER2 has a length corresponding to 300,000 transmission units and each of the sub-periods SP_1 to SP_m identically has a length corresponding to 1,000 transmission units and m is 300, the remaining power calculator 1320 of FIG. 1 may store 300 partial remaining power levels instead of storing 300,000 remaining power levels.

Figure 5:
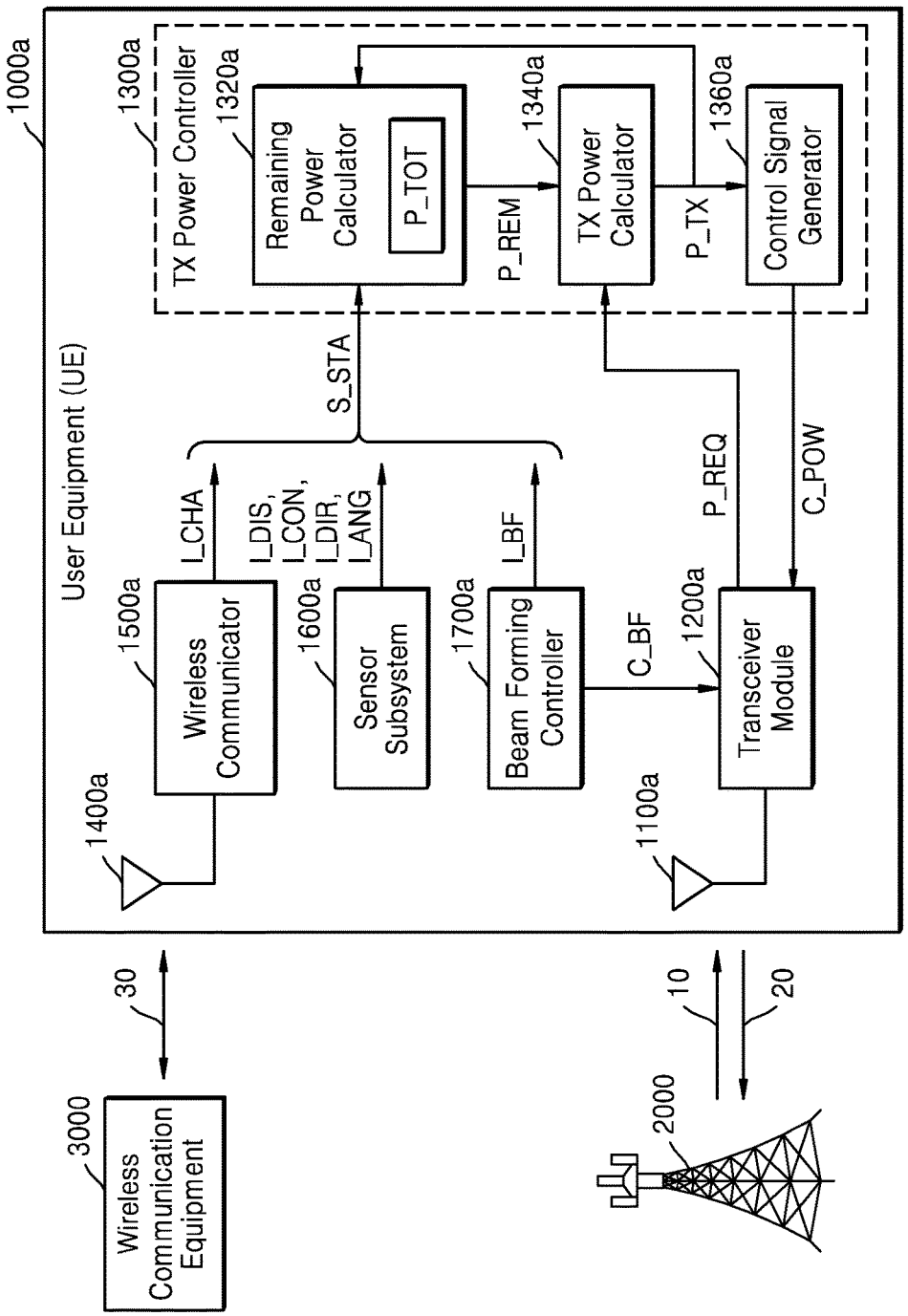
FIG. 5 is a block diagram illustrating an example of a wireless communication system using a transmission power control method, according to an example embodiment.

FIG. 5 is a block diagram illustrating an example of a wireless communication system using a transmission power control method, according to an example embodiment. As illustrated in FIG. 5, UE 1000a may include an antenna 1100a, a transceiver 1200a, and a transmission power controller 1300a. In comparison with the UE 1000 of FIG. 1, the UE 1000a may further include an antenna 1400a, a wireless communication module 1500a, a sensor subsystem 1600a, and a beamforming controller 1700a. Hereinafter, in a description made with reference to FIG. 5, descriptions of details which are the same as the details described above with reference to FIG. 1 are not repeated.

According to an example embodiment, a remaining power level P_REM may be calculated based on a status of the UE 1000a. For example, as illustrated in FIG. 5, a remaining power calculator 1320a of the transmission power controller 1300a may receive a status signal S_STA including information about the status of the UE 1000a and may calculate the remaining power level P_REM based on the status signal S_STA. As described above, an SAR of a user of the UE 1000a may be determined based on various factors. Thus, transmission power may be appropriately controlled by reflecting the status of the UE 1000a in the remaining power level P_REM.

The wireless communication communicator 1500a may communicate with a wireless communication device 3000 through a wireless communication channel 30 in a wireless communication scheme different from a downlink channel 10 and an uplink channel 20. For example, the wireless communication channel 30 may be established based on a wireless communication scheme such as wireless fidelity (WiFi), wireless broadband Internet (WiBro), world interoperability for microwave access (WIMAX), ZigBee, Bluetooth, and/or the like as a non-restrictive example. Also, the wireless communication device 3000 may be, for non-limiting example, an AP, a wearable computer, earphones, a headset, or the like. RF signals which are output through the antenna 1400a for communicating with the wireless communication device 3000 may contribute to energy emitted from the UE 1000a, thereby affecting an SAR. Accordingly, the status signal S_STA may include channel information I_CHA about the wireless communication channel 30.

The sensor subsystem 1600a may include at least one sensor that senses the status of the UE 1000a affecting an SAR. In an example embodiment, the sensor subsystem 1600a may include a tilt sensor that senses an angle of the UE 1000a. A possibility that the angle of the UE 1000a is within a certain range may be high. Accordingly, the status signal S_STA may include angle information I_ANG generated by the tilt sensor.

In an example embodiment, the sensor subsystem 1600a may include a grip sensor. The grip sensor may sense whether a user contacts the UE 1000a, or whether the user grips the UE 1000a. In a case that the user contacts the UE 1000a, as a contact area increase, an SAR may increase. Therefore, the status signal S_STA may include contact information I_CON generated by the grip sensor.

In an example embodiment, the sensor subsystem 1600a may include a proximity sensor. The proximity sensor may sense a distance between the user and the UE 1600a. As the distance between the user and the UE 1600a is reduced, an SAR may increase. The status signal S_STA may include distance information I_DIS generated by the proximity sensor. Further, the proximity sensor may sense a direction of the user with respect to the UE 1000a. In a case where the antenna 1100a and the transceiver 1200a of the UE 1000a perform directional transmission for transmitting a signal to a position of a base station 2000, as a direction of the base station 2000 with respect to the UE 1000a and a direction of the user with respect to the UE 1000a become more similar, an SAR may increase. Accordingly, the status signal S_STA may include user direction information I_DIR generated by the proximity sensor.

The beamforming controller 1700a may control an antenna beam formed in the antenna 1100a. As illustrated in FIG. 5, the beamforming controller 1700a may output a beamforming control signal C_BF, and the transceiver 1200a may form an antenna beam in the antenna 1100a based on the beamforming control signal C_BF. As described above, a type of the beam formed in the antenna 1100a and the direction of the user may affect an SAR. The status signal S_STA may include beamforming information I_BF generated by the beamforming controller 1700a.

According an example embodiment, the status signal S_STA may include all or some of the above-described various pieces of status information. The remaining power calculator 1320a may calculate the remaining power level P_REM, based on at least some of a plurality of pieces of status information.

Figure 6:
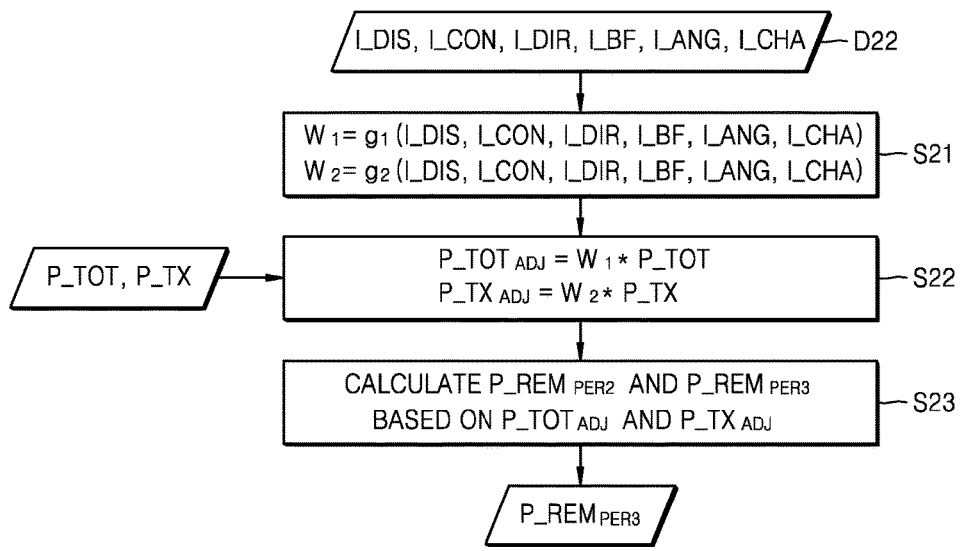
FIG. 6 is a flowchart illustrating an example of an operation of a remaining power calculator of FIG. 5 according to an example embodiment.

FIG. 6 is a flowchart illustrating an example of an operation of the remaining power calculator 1320a of FIG. 5 according to an example embodiment. As illustrated in FIG. 6, the remaining power calculator 1320a may control a tolerant power level P_TOT and/or a transmission power level P_TX based on a status of the UE 1000a, and calculate a remaining power level P_REM. Referring to FIG. 6, status information D22 including distance information I_DIS, contact information I_CON, direction information I_DIR, beamforming information I_BF, angle information I_ANG, and channel information I_CHA may be used.

In operation S21, an operation of calculating a first weight value $W_1$ and a second weight value $W_2$ based on the status information D22 may be performed. The first weight value $W_1$ may be used to adjust the tolerant power level P_TOT, and the second weight value $W_2$ may be used to adjust the transmission power level P_TX. As illustrated in FIG. 6, the first weight value $W_1$ may be calculated by a first function $g_1$ having the status information D22 as a parameter, and the second weight value $W_2$ may be calculated by a second function $g_2$ having the status information D22 as a parameter.

If upward controlling of an SAR by the UE 1000a according to the status information D22 is desired, the first function $g_1$ may output the first weight value $W_1$ having a relatively small value in order for an adjusted tolerant power level P_TOT$_{ADJ}$ to decrease. Also, if downward controlling of the SAR by the UE 1000a according to the status information D22 is desired, the first function $g_1$ may output the first weight value $W_1$ having a relatively large value in order for the adjusted tolerant power level P_TOT$_{ADJ}$ to increase. For example, by the first function $g_1$, the first weight value $W_1$ may be proportional to a distance which the distance information I_DIS represents and may be inversely proportional to a contact area which the contact information I_CON represents. Further, by the first function $g_1$, the first weight value $W_1$ may be inversely proportional to a correlation between the beamforming information I_BF and a direction which the user direction information I_DIR represents, and may be inversely proportional to a correlation between an angle which the angle information I_ANG represents and an angle of the UE 1000a which is being used by the user. Also, the first function $g_1$ may be output as the first weight value $W_1$ having a relatively small value when a communication channel which the channel information I_CHA represents is activated.

On the other hand, if upward controlling of an SAR by the UE 1000a according to the status information D22 is desired, the second function $g_2$ may output the second weight value $W_2$ having a relatively large value in order for an adjusted transmission power level P_TX$_{ADJ}$ to increase. Further, if downward controlling of the SAR by the UE 1000a according to the status information D22, the second function $g_2$ may output the second weight value $W_2$ having a relatively small value in order for the adjusted transmission power level P_TX$_{ADJ}$ to be reduced. For example, by the second function $g_2$, the second weight value $W_2$ may be inversely proportional to the distance which the distance information I_DIS represents and may be proportional to the contact area which the contact information I_CON represents. Further, by the second function $g_2$, the second weight value $W_2$ may be proportional to a correlation between the beamforming information I_BF and a direction which the user direction information I_DIR represents, and may be inversely proportional to the correlation between the angle which the angle information LANG represents and the angle of the UE 1000a which is being used by the user. Also, the second function $g_2$ may be output as the second weight value $W_2$ having a relatively small value when the communication channel which the channel information I_CHA represents is activated.

In operation S22, an operation of calculating the adjusted tolerant power level P_TOT$_{ADJ}$ from the tolerant power level P_TOT by using the first weight value $W_1$ and calculating the adjusted transmission power level P_TX$_{ADJ}$ from the transmission power level P_TX by using the second weight value $W_2$ may be performed. By the first weight value $W_1$ and the second weight value $W_2$, which have been calculated in operation S21, the status of the UE 1000a may be reflected in the adjusted tolerant power level P_TOT$_{ADJ}$ and the adjusted transmission power level P_TX$_{ADJ}$.

In operation S23, an operation of calculating the remaining power levels P_REM$_{PER2}$ and P_REM$_{PER3}$ may be performed based on the adjusted tolerant power level P_TOT$_{ADJ}$ and the adjusted transmission power level P_TX$_{ADJ}$. For example, the remaining power level of the second period may be calculated based on one of the adjusted tolerant power level of the first period or the adjusted transmission power level of the second period, and the remaining power level of the third period may be calculated based on the remaining power level of the second period (e.g., based on one of the adjusted tolerant power level of the first period or the adjusted transmission power level of the second period). Accordingly, the remaining power levels P_REM$_{PER2}$ and P_REM$_{PER3}$, in which various factors of the SAR are reflected, may be calculated, and the remaining power level P_REM$_{PER3}$ of the third period PER3 may be output.

Figure 7:
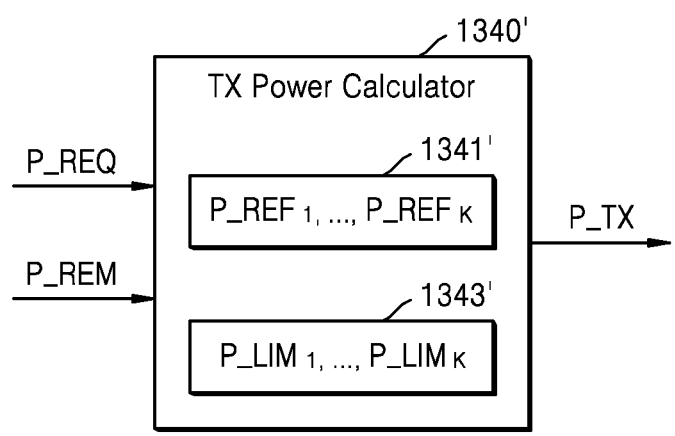
FIG. 7 is a block diagram illustrating an example of a transmission power calculator of FIG. 1 according to an example embodiment.
Figure 8:
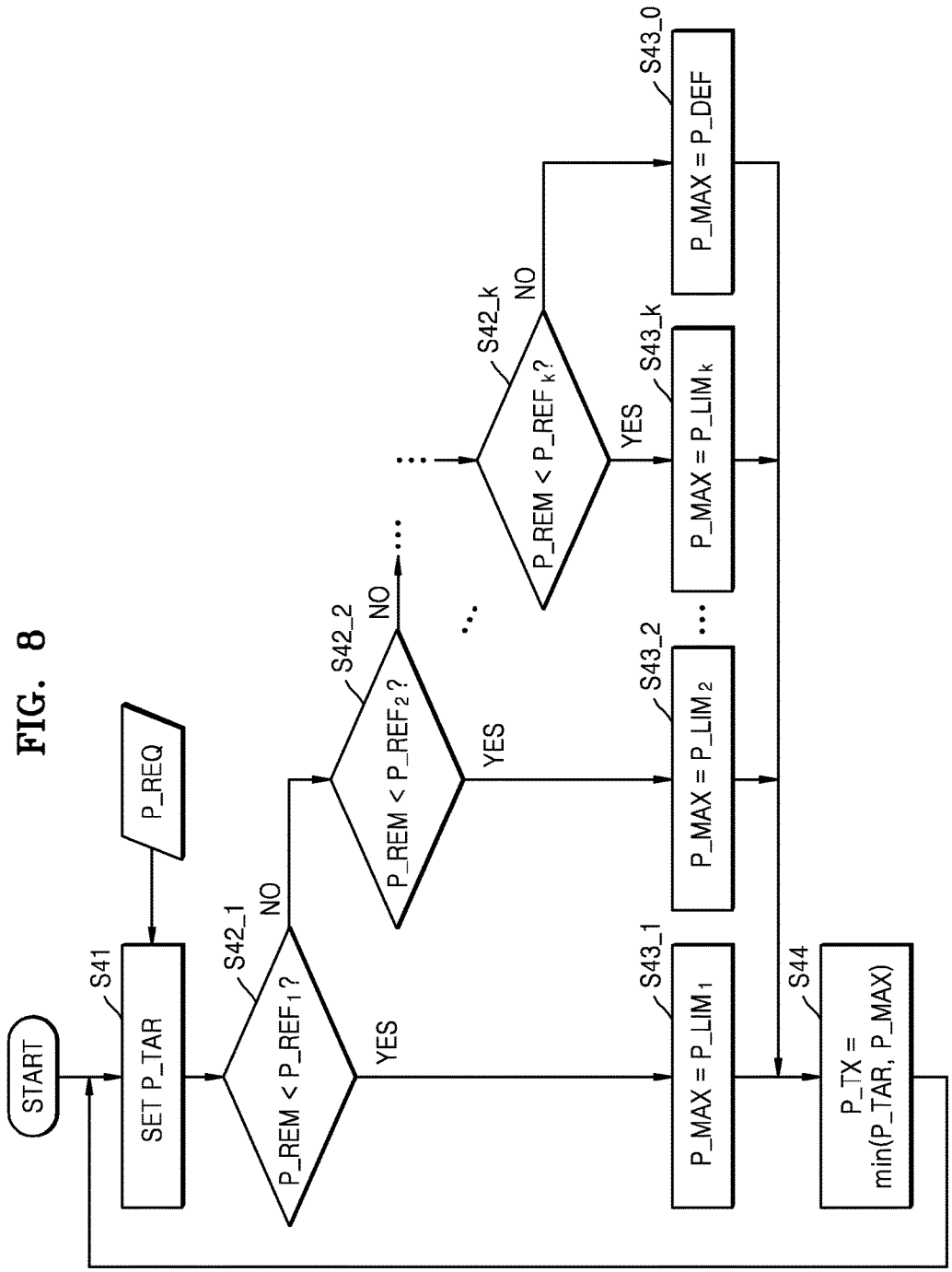
FIG. 8 is a flowchart illustrating an operation of the transmission power calculator of FIG. 7 according to an example embodiment.

FIG. 7 is a block diagram illustrating an example of the transmission power calculator 1340 of FIG. 1 according to an example embodiment, and FIG. 8 is a flowchart illustrating an operation of the transmission power calculator 1340' of FIG. 7 according to an example embodiment. As described above with reference to FIG. 1, the transmission power calculator 1340' may receive the request power level P_REQ from the transceiver 1200 of FIG. 1, receive the remaining power level P_REM from the remaining power calculator 1320 of FIG. 1, and output the transmission power level P_TX to the control signal generator 1360 of FIG. 1.

Referring to FIG. 7, the transmission power calculator 1340' may include a plurality of reference levels P_REF$_1$ to P_REF$_k$ and a plurality of limit levels P_LIM$_1$ to P_LIM$_k$ corresponding to the plurality of reference levels P_REF$_1$ to P_REF$_k$, respectively. For example, the transmission power calculator 1340' may include a storage space (not shown), which stores the plurality of reference levels P_REF$_1$ to P_REF$_k$ and the plurality of limit levels P_LIM$_1$ to P_LIM$_k$, such as a memory or a register. As described below with reference to FIG. 8, the transmission power calculator 1340' may compare the remaining power level P_REM with at least one of the plurality of reference levels P_REF$_1$ to P_REF$_k$ and may determine the transmission power level P_TX, based on a result of the comparison. That is, the transmission power calculator 1340' may restrict the transmission power level P_TX as one of the plurality of reference levels P_REF$_1$ to P_REF$_k$, based on the comparison result.

Referring to FIG. 8, in operation S41, an operation of setting a target power level P_TAR based on the request power level P_REQ may be performed. The target power level P_TAR may be set as the request power level P_REQ, which is a transmission power level requested by the base station 2000 of FIG. 1, or may be set as a dummy power level P_DUM (shown in FIG. 12).

In operations S42_1 to S42_$k$, an operation of comparing the remaining power level PREM and each of the plurality of reference levels P_REF$_1$ to P_REF$_k$ may be performed. For example, whether to perform operation S42_$j$+1 of comparing the remaining power level PREM and a reference level P_REF$_{j+1}$ may be determined based on a result of comparison which is performed in operation S42_$j$ of comparing the remaining power level P_REM and a reference level P_REF$_j$). That is, the remaining power level P_REM may be compared with at least one of the plurality of reference levels P_REF$_1$ to P_REF$_k$. The plurality of reference levels P_REF$_1$ to P_REF$_k$ may be sorted in ascending power (e.g., P_REF$_j$<P_REF$_{j+1}$).

In operations S43_0 to S43_$k$, an operation of setting a maximum power level P_MAX as one of the plurality of limit levels P_LIM$_1$ to P_LIM$_k$ or a default power level P_DEF may be performed based on a result obtained by comparing the remaining power level P_REM with at least one of the plurality of reference levels P_REF$_1$ to P_REF$_K$. For example, when the remaining power level P_REM is lower than the reference level P_REF$_j$ in operation S42_$j$, the maximum power level P_MAX may be set as a limit level P_LIM$_j$. When it is compared in operation S42_$k$ that the remaining power level P_REM is equal to or more than the reference level P_REF$_k$ which is the highest in the plurality of reference levels P_REF$_1$ to P_REF$_k$, the maximum power level P_MAX may be set as the default power level P_DEF. The plurality of limit levels P_LIM$_1$ to P_LIM$_k$ may be sorted in ascending power (e.g., P_LIM$_j$≤P_LIM$_{j+1}$). That is, as the remaining power level P_REM is lowered, the maximum power level P_MAX may become lower.

In operation S44, the transmission power level P_TX may be set as the lower level of the target power level P_TAR and the maximum power level P_MAX. That is, the transmission power level P_TX may be set as the target power level P_TAR, which is irrelevant to the SAR, or may be limited to the maximum power level P_MAX associated with the SAR.

Figure 9:
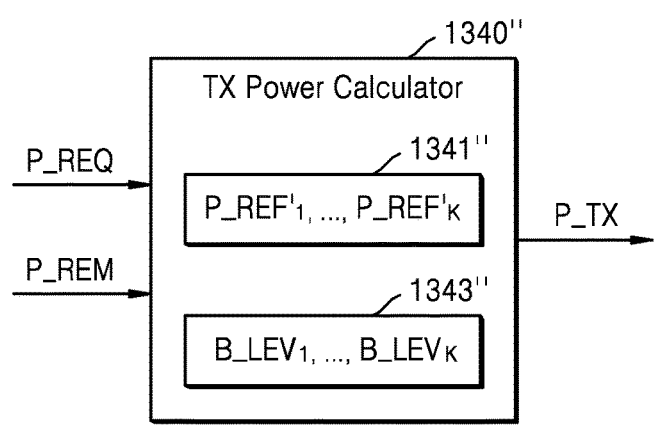
FIG. 9 is a block diagram illustrating an example of the transmission power calculator of FIG. 1 according to an example embodiment.
Figure 10:
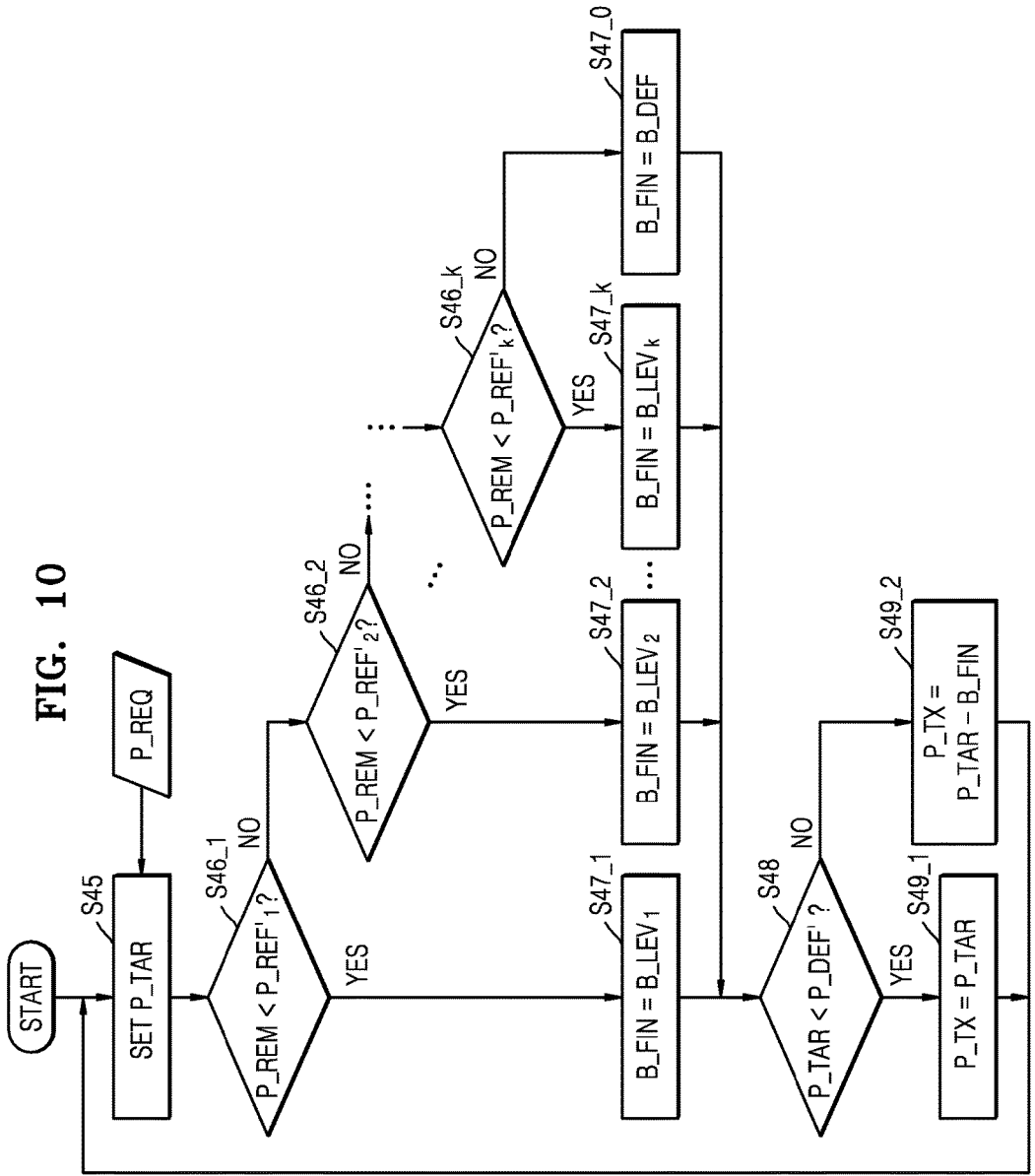
FIG. 10 is a flowchart illustrating an operation of the transmission power calculator of FIG. 9 according to an example embodiment.

FIG. 9 is a block diagram illustrating an example 1340" of the transmission power calculator 1340 of FIG. 1 according to an example embodiment, and FIG. 10 is a flowchart illustrating an operation of a transmission power calculator 1340" of FIG. 9 according to an example embodiment.

Referring to FIG. 9, the transmission power calculator 1340" may include a first storage 1341" and a second storage 1343". The first storage 1341" may be configured to store a plurality of reference levels P_REF'$_1$ to P_REF'$_k$, and the second storage 1343" may be configured to store a plurality of backoff levels B_LEV$_1$ to B_LEV$_k$ corresponding to the plurality of reference levels P_REF'$_1$ to P_REF'$_k$, respectively. For example, the transmission power calculator 1340" may include a storage space (not shown), which stores the plurality of reference levels P_REF'$_1$ to P_REF'$_k$ and the plurality of backoff levels B_LEV$_1$ to B_LEV$_k$, such as a memory or a register. As described below with reference to FIG. 10, the transmission power calculator 1340" may compare the remaining power level P_REM with at least one of the plurality of reference levels P_REF'$_1$ to P_REF'$_k$ and may determine the transmission power level P_TX based on a result of the comparison. For example, the transmission power calculator 1340" may decrease the target power level P_TAR by one of the plurality of backoff levels B_LEV$_1$ to B_LEV$_k$ based on the comparison result.

Referring to FIG. 10, in operation S45, an operation of setting the target power level P_TAR based on the request power level P_REQ may be performed. Subsequently, in operations S46_1 to S46_$k$, an operation of comparing the remaining power level P_REM and each of the plurality of reference levels P_REF'$_1$ to P_REF'$_k$ may be performed. For example, whether to perform operation S46_$j$+1 of comparing the remaining power level P_REM and a reference level P_REF'$_{j+1}$ may be determined based on a result of comparison which is performed in operation S46_$j$ (e.g., comparing the remaining power level PREM to a reference level P_REF'$_j$). That is, the remaining power level P_REM may be compared with at least one of the plurality of reference levels P_REF'$_1$ to P_REF'$_k$. The plurality of reference levels P_REF'$_1$ to P_REF'$_k$ may be sorted in ascending power (e.g., P_REF'$_j$<P_REF'$_{j+1}$).

In operations S47_0 to S47_$k$, an operation of setting a final backoff level B_FIN as one of the plurality of backoff levels B_LEV$_1$ to B_LEV$_k$ or the default power level B_DEF may be performed based on a result obtained by comparing the remaining power level P_REM with at least one of the plurality of reference levels P_REF'$_1$ to P_REF'$_k$. For example, when the remaining power level P_REM is lower than the reference level P_REF'$_j$ in operation S46_$j$, the final backoff level B_FIN may be set as a backoff level B_LEV$_1$. In operation S46_$k$ if the remaining power level P_REM is equal to or more than the reference level P_REF'$_k$, which is the highest in the plurality of reference levels P_REF'$_1$ to P_REF'$_k$, the final backoff level B_FIN may be set as the default power level P_DEF. The plurality of limit levels P_LIM$_1$ to P_LIM$_k$ may be sorted in descending power (e.g., P_LIM$_j$≥P_LIM$_{j+1}$). That is, as the remaining power level P_REM is lowered, the final backoff level B_FIN may become higher.

In operation S48, an operation of comparing the target power level P_TAR and a default power level P_DEF' may be performed. When the target power level P_TAR is lower than the default power level P_DEF', an operation of setting the transmission power level P_TX as the target power level P_TAR may be performed in operation S49_1. When the target power level P_TAR is equal to or more than the default power level P_DEF', the transmission power level P_TX may be set as a difference between the target power level P_TAR and the final backoff level B_FIN in operation S49_2.

Figure 11:
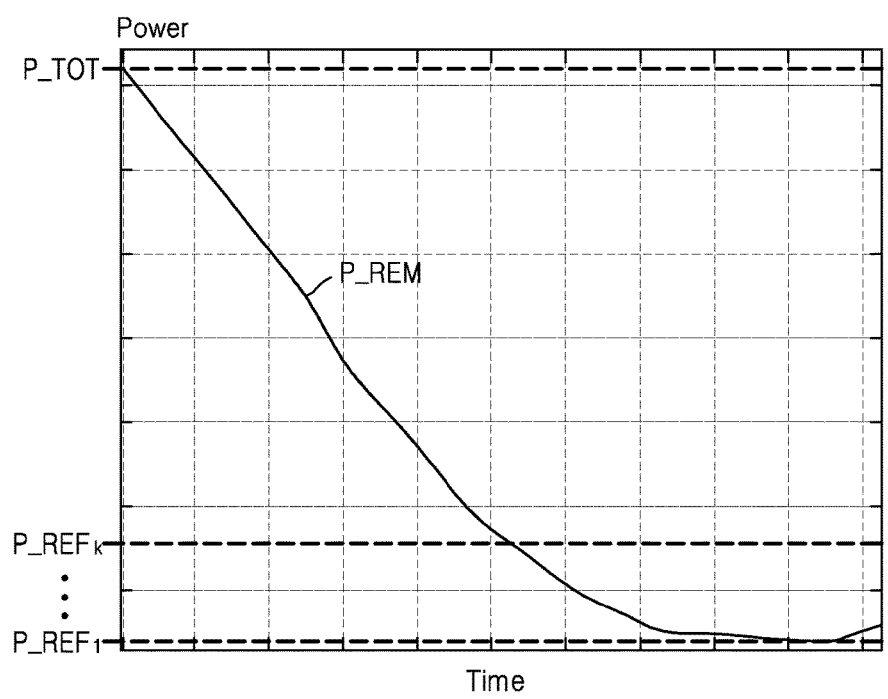
FIG. 11 is a graph showing a variation of a remaining power level with respect to time according to an example embodiment.

FIG. 11 is a graph showing a variation of a remaining power level P_REM with respect to time according to an example embodiment. As described above with reference to FIGS. 7 to 10, the remaining power level P_REM may be compared with at least one of the plurality of reference levels P_REF$_1$ to P_REF$_k$. Hereinafter, FIG. 11 will be described with reference to FIG. 8.

Referring to FIG. 11, when wireless transmission is continuously performed at a relatively high transmission power level P_TX due to the request power level P_REQ having a relatively high value (e.g., when the uplink channel 20 of FIG. 1 is not good), the remaining power level P_REM may be progressively lowered from the tolerant power level P_TOT according to a passage of time. At a time when the remaining power level PREM starts to become lower than the reference level P_REF$_k$, the transmission power level P_TX may be limited by the limit level P_LIM$_k$. Thus, when the remaining power level P_REM is continuously lowered, the transmission power level P_TX may sequentially intersect the plurality of reference levels P_REF$_k$ to P_REF$_1$. The transmission power level P_TX may be limited according to the limit levels $P\_LIM_k$ to $P\_LIM_1$ corresponding to the reference levels $P\_REF_k$ to $P\_REF_1$, and thus, as shown in FIG. 11, the remaining power level PREM may be gradually lowered below the highest reference level $P\_REF_k$.

Figure 12:
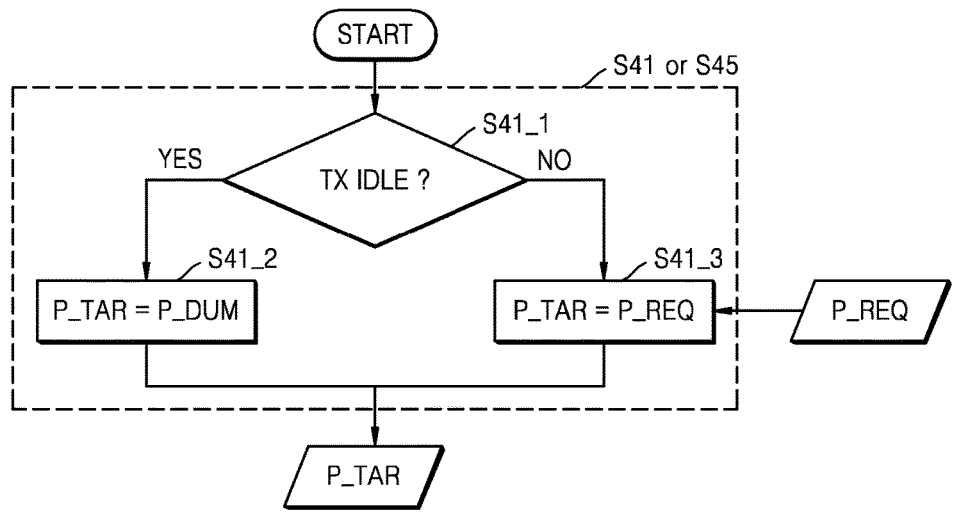
FIG. 12 is a flowchart illustrating a method of setting a target power level according to an example embodiment.
Figure 13:
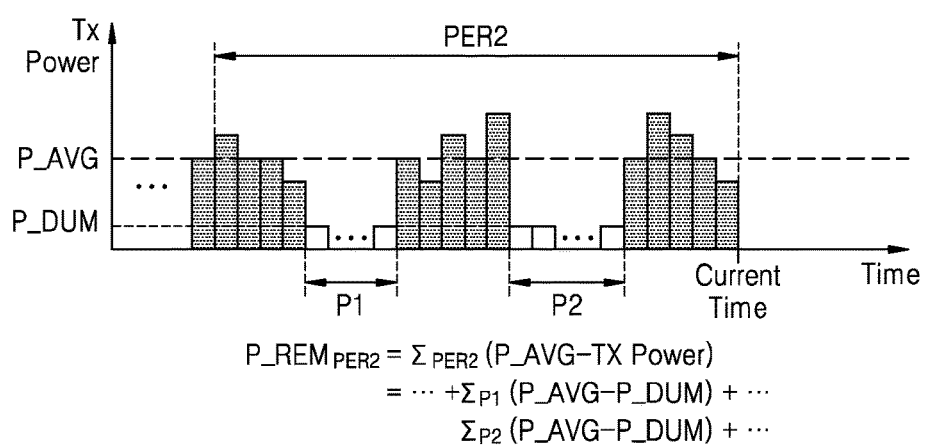
FIG. 13 is a diagram showing a cumulative power level of a second period including periods where there is no wireless transmission, according to an example embodiment.

FIG. 12 is a flowchart illustrating a method of setting a target power level P_TAR according to an example embodiment, and FIG. 13 is a diagram showing a remaining power level $P\_REM_{PER2}$ of a second period PER2 including periods where there is no wireless transmission, according to an example embodiment. For example, FIG. 12 illustrates an example of operation S41 of FIG. 8 or operation S45 of FIG. 10 performed by the transmission power calculator 1340 of FIG. 1. Hereinafter, FIGS. 12 and 13 will be described with reference to FIG. 1.

Referring to FIG. 12, an operation of determining whether a current period is a period where wireless transmission is not performed may be performed in operation S41_1. For example, in LTE, the UE 1000 may be in an RRC_CONNECTED status or an RRC_IDLE status. The RRC_CONNECTED status may be a status where "RRC context" is provided, namely, a status where parameters desired for communication between the UE 1000 and the base station 2000 are known to both sides. In the RRC_CONNECTED status, discontinuous reception (DRX) may be set in the UE 1000 so as to reduce power consumption. Also, for example, if a user voice input is not sufficient, the UE 1000 may shut off the wireless transmission or may mute a sound, thereby setting discontinuous transmission (DTX). In the RRC_IDLE status, the UE 1000 may not belong to a specific cell without "RRC context." In order to reduce power consumption, the UE 1000 may enter a sleep mode for substantial portion(s) of time in the RRC_IDLE status, and thus the wireless transmission may not be performed. The transmission power calculator 1340 may determine whether the UE 1000 is in a period where the wireless transmission is not performed, and thus may set the target power level P_TAR differently. That is, the transmission power calculator 1340 may generate the target power level P_TAR even in a period where the wireless transmission is not performed, thereby calculating the transmission power level P_TX. The remaining power level $P\_REM_{PER2}$ of the second period PER2 may be updated by the calculated transmission power level P_TX. Accordingly, irrespective of the presence of wireless transmission, energy emitted from the UE 1000 may be managed during a certain period (for example, the first period PER1 of FIG. 1).

When the wireless transmission is not performed, the target power level P_TAR may be set as the dummy power level P_DUM in operation S41_2, and otherwise, the target power level P_TAR may be set as the request power level P_REQ in operation S41_3. That is, in a period where the wireless transmission is not performed, the transmission power level P_TX may be set as the dummy power level P_DUM having a desired (or alternatively, predetermined) value. The dummy power level P_DUM may have a desired (or alternatively, predetermined) level, The desired (or alternatively, predetermined) level may be a minimum power level or zero.

Referring to FIG. 13, in periods P1 and P2 where the wireless transmission is not performed, the transmission power level P_TX may be the dummy power level P_DUM. As described above with reference to FIG. 12, the wireless transmission, when the UE 1000 is in a sleep status, may not be performed in the periods P1 and P2, or a period. In periods P1 and P2 where the wireless transmission is not performed, the target power level P_TAR may be set as the dummy power level P_DUM, and if the dummy power level P_DUM has zero or a value having a minimum power level, the transmission power level P_TX may be equal to the dummy power level P_DUM irrespective of the remaining power level P_REM. The remaining power level $P\_REM_{PER2}$ of the second period PER2 may be obtained by accumulating differences between the average power level P_AVG and the dummy power level P_DUM in the periods P1 and P2 where the wireless transmission is not performed.

Figure 14:
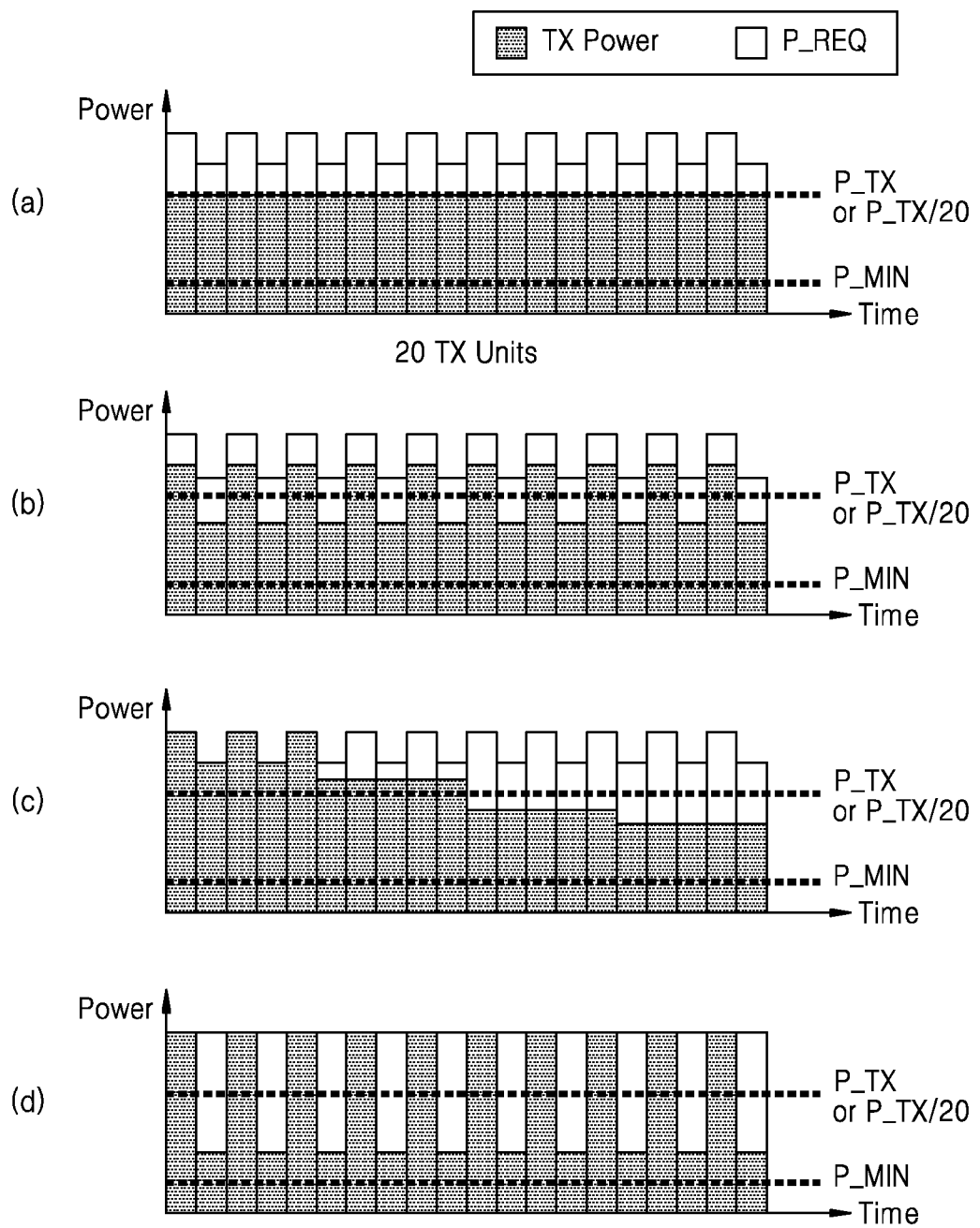
FIG. 14 shows examples of controlling transmission power of a transmission unit with respect to time according to an example embodiment.

FIG. 14 shows examples of controlling transmission power of a transmission unit with respect to time according to an example embodiment. For example, FIG. 14 shows an example operation of the control signal generator 1360 of FIG. 1. As described above with reference to FIG. 1, the control signal generator 1360 may generate the power control signal C_POW based on the transmission power level P_TX received from the transmission power calculator 1340. The power control signal C_POW may be used to determine a power level (e.g., TX power) of transmission units (e.g., TX unit). Hereinafter, FIG. 14 will be described with reference to FIG. 1.

According to an example embodiment, the transmission power level P_TX received by the control signal generator 1360 may correspond to a series of transmission units. For example, as shown in FIG. 14, the transmission power level P_TX generated by the transmission power calculator 1340 may correspond to twenty transmission units. The transmission power level P_TX may correspond to an average power level of twenty transmission units, or may correspond to a total power level of the twenty transmission units. That is, a level illustrated as a dotted line in FIG. 14 may be the transmission power level P_TX, or may be the average power level obtained by dividing the transmission power level P_TX by 20 which is the number of transmission units. Hereinafter, the level illustrated as the dotted line in FIG. 14 will be assumed as the transmission power level P_TX.

The control signal generator 1360 may generate the power control signal C_POW in order for a plurality of transmission units to satisfy the transmission power level P_TX. For example, as shown in FIG. 14 (a), the control signal generator 1360 may generate the power control signal C_POW in order for a power level of each transmission unit to become equal to or less than the transmission power level P_TX. Also, as shown in FIG. 14 (b) to (d), the control signal generator 1360 may generate the power control signal C_POW in order for a total power level of two transmission units to satisfy the transmission power level P_TX. Also, the control signal generator 1360 may generate the power control signal C_POW in order for a power level of a transmission unit to become equal to or more than a minimum power level P_MIN for maintaining a connection with the base station 2000. For example, as shown in FIG. 14, each of the transmission units may have a power level equal to or more than the minimum power level P_MIN by the control signal generator 1360.

Figure 15:
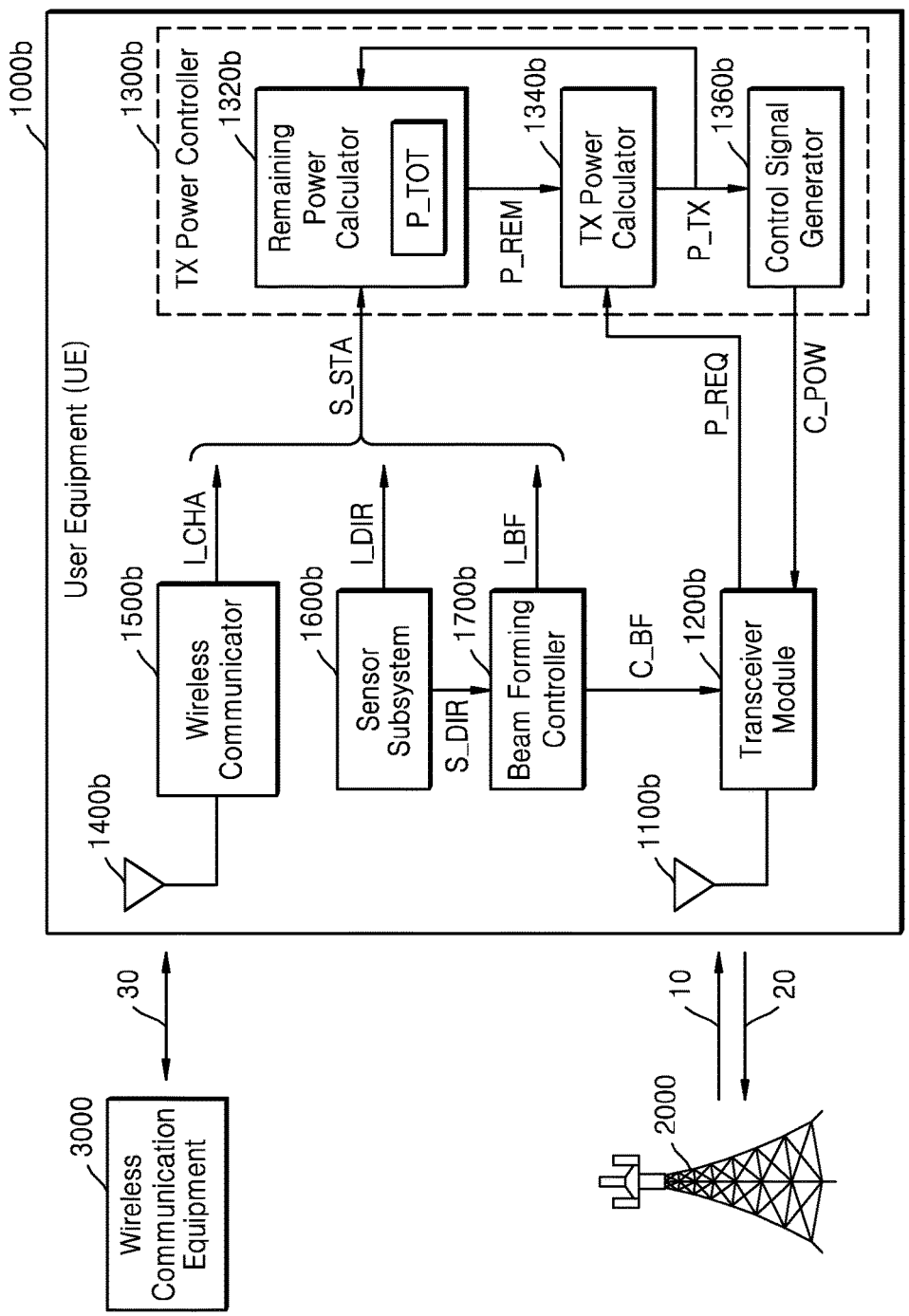
FIG. 15 is a block diagram illustrating an example of a wireless communication system using a transmission power control method, according to an example embodiment.

FIG. 15 is a block diagram illustrating an example of a wireless communication system using a transmission power control method, according to an example embodiment. As illustrated in FIG. 15, UE 1000b may further include an antenna 1100b, a transceiver 1200b, a transmission power controller 1300b, an antenna 1400b, a wireless communication communicator 1500b, a sensor subsystem 1600b, and a beamforming controller 1700b. In comparison with the UE 1000a of FIG. 5, the sensor subsystem 1600b may output a direction signal S_DIR to the beamforming controller 1700b. Hereinafter, in description made with reference to FIG. 15, descriptions of details which are the same as the details described above with reference to FIG. 5 are not repeated.

According to an example embodiment, the UE 1000b may modify a beam for decreasing an SAR by wireless transmission. As illustrated in FIG. 15, the sensor subsystem 1600b may include a proximity sensor that senses a direction of a user with respect to the UE 1000a, and may include information I_DIR about the direction of the user. The sensor subsystem 1600b may output the direction signal S_DIR generated by the proximity sensor to the beamforming controller 1700b. The beamforming controller 1700b may output a beamforming control signal C_BF for modifying a type (e.g., a direction of a beam and/or a shape of the beam) of the beam formed in the antenna 1100b in response to the direction signal S_DIR. That is, the beamforming controller 1700a may generate the beamforming control signal C_BF so as to decrease a correlation between the direction of the user and beamforming. For example, the beamforming controller 1700b may modify a shape of the beam formed near the antenna 1200b so that a portion of the beam overlapping the direction of the user is reduced.

Figure 16:
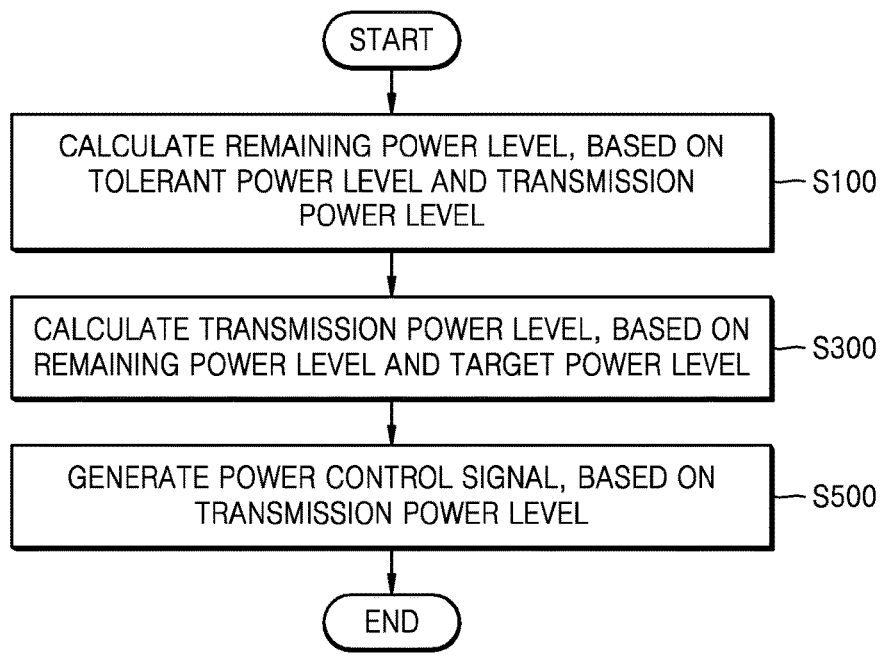
FIG. 16 is a flowchart illustrating a method of controlling transmission power in a wireless communication device, according to an example embodiment.

FIG. 16 is a flowchart illustrating a method of controlling transmission power in a wireless communication device according to an example embodiment. The transmission power control method may be performed by a transmission power control device (e.g., the transmission power controller 1300) of FIG. 1. Hereinafter, FIG. 16 will be described with reference to FIG. 1.

In operation S100, an operation of calculating the remaining power level PREM based on the tolerant power level P_TOT and the transmission power level P_TX may be performed. For example, referring to FIGS. 3A and 3B, the remaining power calculator 1320 of the transmission power controller 1300 may calculate the remaining power level $P\_REM_{PER2}$ of the second period PER2 of a point in time in the past from the current time, based on the transmission power level P_TX and the tolerant power level $P\_TOT_{PER1}$ of the first period PER1 and may calculate the remaining power level $P\_REM_{PER3}$ of the third period PER3 by reflecting the remaining power level $P\_REM_{PER2}$ of the second period PER2 and the tolerant power level $P\_TOT_{PER3}$ of the third period PER3 of a certain time point in the future from the current time. The tolerant power level $P\_TOT_{PER1}$ of the first period PER1 may be determined based on the limit SAR $SAR_{limit}$, and the remaining power level $P\_REM_{PER2}$ may be calculated from the transmission power levels of the second period PER2.

In operation S300, an operation of calculating the transmission power level P_TX based on the remaining power level P_REM and the target power level P_TAR may be performed. For example, the transmission power calculator 1340 of the transmission power controller 1300 may set the target power level P_TAR, based on the request power level P_REQ and may determine the transmission power level P_TX or a level which is lower than the target power level P_TAR as the target power level P_TAR based on the remaining power level P_REM.

In operation S500, an operation of generating the power control signal C_POW, which may be used to determine a power level of a transmission unit, based on the transmission power level P_TX may be performed. If the transmission power level P_TX corresponds to one transmission unit, the control signal generator 1360 of the transmission power controller 1300 may generate the power control signal C_POW according to the transmission power level P_TX, and if the transmission power level P_TX corresponds to a series of transmission units, the control signal generator 1360 may sequentially generate a series of power control signals C_POW, based on the transmission power level P_TX.

Figure 17:
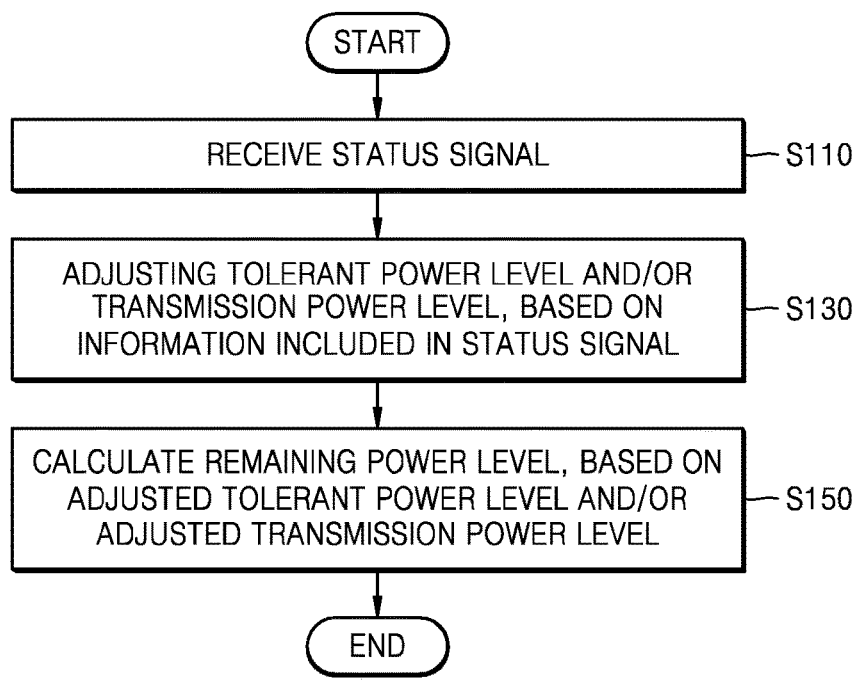
FIG. 17 is a flowchart illustrating a method of calculating a remaining power level, according to an example embodiment.

FIG. 17 is a flowchart illustrating a method of calculating a remaining power level P_REM according to an example embodiment. The method of FIG. 17 may represent an example of operation S100 of FIG. 16 and may be performed by the remaining power calculator 1320a included in the transmission power controller 1300a of FIG. 5. The SAR of the user of the UE 1000a may be determined based on various factors. Thus in order to reflect the various factors, a status of the UE 1000a may be considered in calculating the remaining power level P_REM. Hereinafter, FIG. 17 will be described with reference to FIG. 5.

In operation S110, an operation of receiving the status signal S_STA may be performed. The status signal S_STA may include status information about the UE 1000a, for example, at least one of the distance information I_DIS, the contact information ICON, the direction information I_DIR, the beamforming information I_BF, the angle information L_ANG, and the channel information I_CHA.

In operation S130, an operation of adjusting the tolerant power level P_TOT and/or the transmission power level P_TX based on information included in the status signal S_STA may be performed. In order to perform upward control or downward control of the SAR by the UE 1000a according to the status information included in the status signal S_STA, the adjusted tolerant power level $P\_TOT_{ADJ}$ and/or the adjusted transmission power level $P\_TX_{ADJ}$ may be generated by adjusting the tolerant power level P_TOT and/or the transmission power level P_TX.

In operation S150, an operation of calculating a remaining power level based on the adjusted tolerant power level $P\_TOT_{ADJ}$ and/or the adjusted transmission power level $P\_TX_{ADJ}$ may be performed. That is, the remaining power level $P\_REM_{PER2}$ of the second period PER2 may be calculated based on the adjusted tolerant power level $P\_TOT_{ADJ}$ and/or the adjusted transmission power level $P\_TX_{ADJ}$. The remaining power level $P\_REM_{PER3}$ of the third period PER3 may be calculated based on the remaining power level $P\_REM_{PER2}$ of the second period PER2. Because the status of the UE 1000a is reflected, the remaining power level $P\_REM_{PER2}$ and the remaining power level $P\_REM_{PER3}$ each may have an actual value in order for the UE 1000a to satisfy the limit SAR $SAR_{limit}$.

Figure 18:
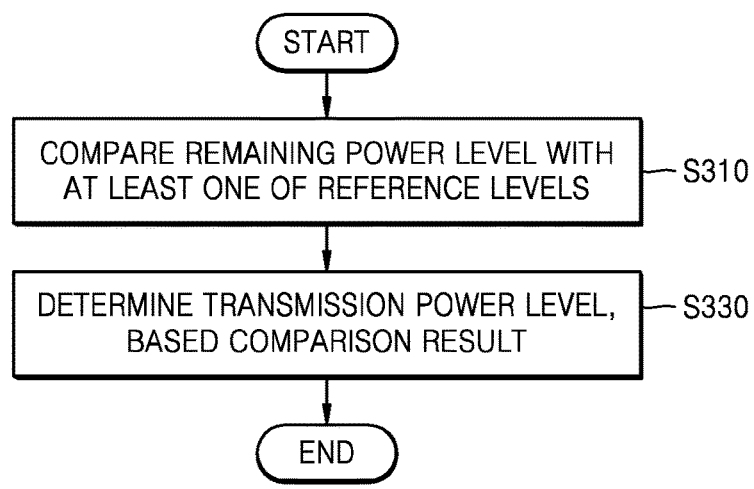
FIG. 18 is a flowchart illustrating a method of calculating a transmission power level, according to an example embodiment.

FIG. 18 is a flowchart illustrating a method of calculating a transmission power level P_TX according to an example embodiment. For example, the method of FIG. 18 may represent an example of operation S300 of FIG. 16 and may be performed by the transmission power calculator 1340 included in the transmission power controller 1300 of FIG. 1. Hereinafter, FIG. 18 will be described with reference to FIGS. 7 and 8 illustrating the transmission power calculator 1340' and an operation thereof.

In operation S310, an operation of comparing the remaining power level P_REM with at least one of a plurality of reference levels may be performed. For example, the remaining power level P_REM may be compared with at least one of the plurality of reference levels $P\_REF_1$ to $P\_REF_k$ included in the transmission power calculator 1340' of FIG. 7. The plurality of reference levels $P\_REF_1$ to $P\_REF_k$ may be sorted in ascending power, and the remaining power level P_REM may be compared with the reference levels $P\_REF_1$ to $P\_REF_k$ in the order of the reference level $P\_REF_1$ having a lowest value to the reference level $P\_REF_k$ having a highest value.

In operation S330, an operation of determining the transmission power level P_TX based on a result of the comparison may be performed. For example, if the remaining power level P_REM is lower than a reference level P_REF$_j$, the transmission power level P_TX may be limited to less than a limit level P_LIM$_j$ corresponding to the reference level P_REF$_j$ among the plurality of limit levels P_LIM$_1$ to P_LIM$_k$ included in the transmission power calculator 1340' of FIG. 7. That is, the transmission power level P_TX may be appropriately limited based on a level of the remaining power level P_REM.

Figure 19:
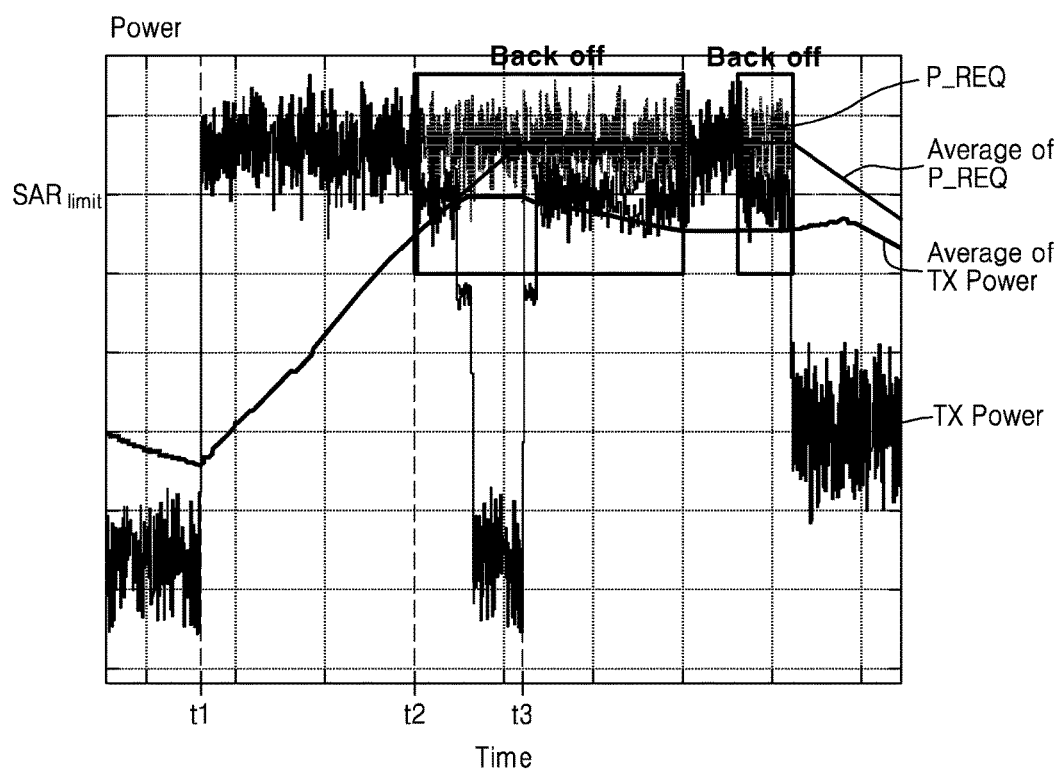
FIG. 19 is a graph showing an example where transmission power is controlled based on a transmission power control method according to an example embodiment.

FIG. 19 is a graph showing an example where transmission power is controlled based on a transmission power control method according to an example embodiment. Referring to FIG. 19, at t1 to t2, power levels (TX power) of transmission units may have a relatively high value according to the request power level P_REQ having a relatively high value, and an average of the power levels (TX power) of the transmission unit may increase. At t2 to t3, as an average of transmission power levels P_TX becomes closer to the limit SAR SAR$_{limit}$, the power levels (TX power) of the transmission units may be limited to a level which is lower than the request power level P_REQ, and thus the average of the power levels (TX power) of the transmission units may increase slight more than a previous average. As shown in FIG. 19, the power levels (TX power) of the transmission unit may be incrementally reduced, and the average of the power levels (TX power) of the transmission unit may be controlled to less than the limit SAR SAR$_{limit}$.

Figure 20:
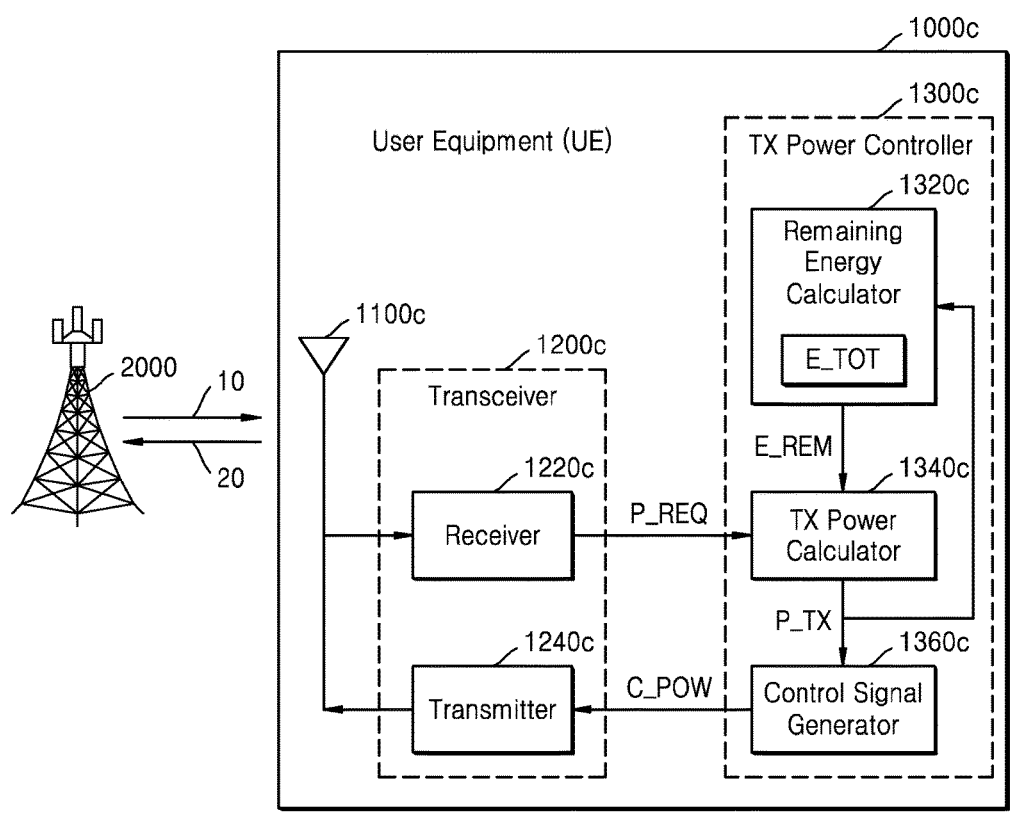
FIG. 20 is a block diagram illustrating an example of a wireless communication system using a transmission power control method, according to an example embodiment.

FIG. 20 is a block diagram illustrating an example of a wireless communication system using a transmission power control method, according to an example embodiment. As illustrated in FIG. 20, UE 1000c may include an antenna 1100c, a transceiver 1200c, and a transmission power controller 1300c. In comparison with the transmission power controller 1300 of FIG. 1, the transmission power controller 1300c of FIG. 20 may include a remaining energy calculator 1320c. Hereinafter, in description made with reference to FIG. 20, descriptions of details which are the same as the details described above with reference to FIG. 1 are not repeated.

According to an example embodiment, the transmission power controller 1300c may calculate remaining emission energy E_REM, based on tolerant emission energy E_TOT and use energy used for wireless transmission and may calculate a transmission power level P_TX, based on the remaining emission energy E_REM. Because an SAR by the UE 1000c is based on energy emitted from the UE 1000c, the transmission power controller 1300c may estimate the use energy emitted from the UE 1000c, based on transmission power used for the wireless transmission and may calculate the remaining emission energy E_REM, based on the use energy and the tolerant emission energy E_TOT determined based on a limit of the SAR.

Referring to FIG. 20, the remaining energy calculator 1320c may include the tolerant emission energy E_TOT and may calculate and output the remaining emission energy E_REM. The remaining energy calculator 1320c may calculate the use energy from the transmission power level P_TX received from the transmission power calculator 1340c. As described above with reference to FIGS. 3A and 3B, the tolerant emission energy E_TOT may correspond to emission energy for allowing the UE 1000c to conform to the limit of the SAR during a first period PER1, and the use emission energy may correspond to energy which is emitted from the UE 1000c during a second period PER2 at a transmission power level of the second period PER2. Further, the remaining emission energy E_REM may correspond to energy capable of being emitted from the UE 1000c conforming to the limit of the SAR during a third period PER3.

Figure 21:
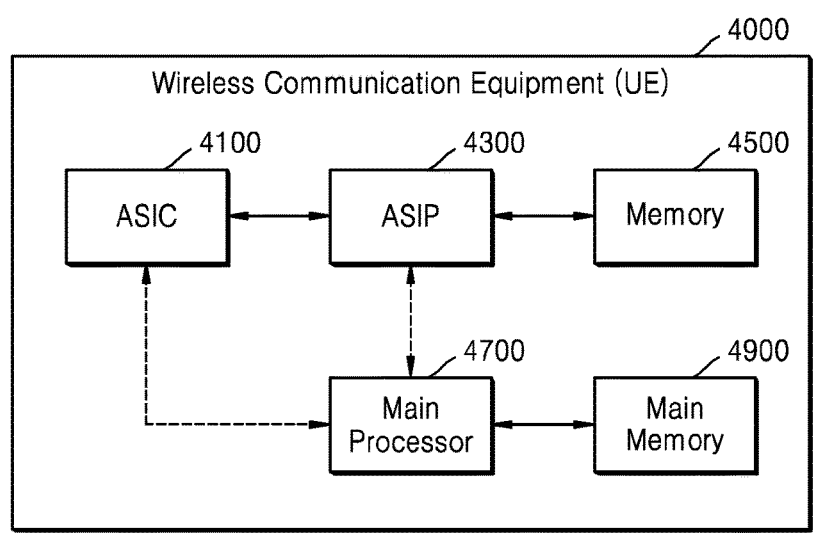
FIG. 21 is an example block diagram of a wireless communication device according to an example embodiment.

FIG. 21 is an example block diagram of a wireless communication device 4000 according to an example embodiment. As illustrated in FIG. 21, the wireless communication device 4000 may include an application specific integrated circuit (ASIC) 4100, an application specific instruction set processor (ASIP) 4300, a memory 4500, a main processor 4700, and a main memory 4900. Two or more of the ASIC 4100, the ASIP 4300, and the main processor 4700 may communicate with each other. Also, two or more of the ASIC 4100, the ASIP 4300, the main memory 4500, the main processor 4700, and the main memory 4900 may be integrated into one chip.

The ASIC 4100 may be an integrated circuit (IC) which is customized for the specific purpose, and for example, may include an RFIC, a modulator, a demodulator, etc. The ASIC 4100 may support a dedicated instruction set for a specific application and may execute instructions included in the instruction set. The memory 4500 may communicate with the ASIP 4300. The memory 4500, a non-transitory storage device, may store a plurality of instructions executed by the ASIP 4300. For example, the memory 4500 may include, for example, an arbitrary type of memory accessible by the ASIP 4300 like a random access memory (RAM), a read-only memory (ROM), a tape, a magnetic disk, an optical disk, a volatile memory, a nonvolatile memory, and a combination thereof.

The main processor 4700 may execute a plurality of instructions to control the wireless communication device 4000. For example, the main processor 4700 may control the ASIC 4100 and the ASIP 4300 and may process data received over a wireless communication network or may process a user input received by the wireless communication device 4000. The main memory 4900 may communicate with the main processor 4700. The main memory 4900, a non-transitory storage device, may store the plurality of instructions executed by the main processor 4900. For example, the main memory 4900 may include an arbitrary type of memory accessible by the main processor 4700 like a RAM, a ROM, a tape, a magnetic disk, an optical disk, a volatile memory, a nonvolatile memory, and a combination thereof.

A step configuring a transmission power control method or an element of a wireless communication device (e.g., the UE 1000 of FIG. 1) according to the above-described example embodiment may be included in at least one of the elements included in the wireless communication device 4000 of FIG. 21. For example, the transmission power controller 1300 of FIG. 1 or at least one of steps of the above-described transmission power control method may be implemented as the plurality of instructions stored in the memory 4500. The ASIP 4300 may execute the plurality of instructions stored in the memory 4500 to perform an operation of the transmission power controller 1300 or at least one step. According to some example embodiments, the transmission power controller 1300 of FIG. 1 or at least one of the steps of the above-described transmission power control method may be implemented as a hardware block and may be included in the ASIC 4100. According to some example embodiments, the transmission power controller 1300 of FIG. 1 or at least one of the steps of the above-described transmission power control method may be implemented as the plurality of instructions stored in the main memory 4900, and the main processor 4700 may execute the plurality of instructions stored in the main memory 4900 to perform an operation of the transmission power controller 1300 or at least one step.

While the s have been particularly shown and described with reference to some example embodiments thereof, it will be understood that various changes in form and details may be made therein without departing from the spirit and scope of the following claims.

What is claimed is:

1. A method of controlling transmission power used for wireless transmission in a wireless communication device, the method comprising:
   calculating a remaining power level of a third period based on a tolerant power level of a first period and a remaining power level of a second period, the third period included in the first period and being a period from a current time to a point in time following the current time, the second period being a period from the current time to a point in time preceding the current time, the tolerant power level being a total transmission power level available to the wireless communication device for the wireless transmission during a certain period;
   calculating a transmission power level of the third period based on a target power level and the remaining power level of the third period; and
   generating a power control signal for determining a power level of a transmission signal unit based on the transmission power level of the third period,
   wherein the calculating of the transmission power level of the third period comprises,
   comparing the remaining power level of the third period with at least one of a plurality of reference levels, and
   determining the transmission power level of the third period based on results of the comparing.

2. The method of claim 1, wherein
   the first period is equal to a sum of the second period and the third period, and
   the calculating of the remaining power level of the third period comprises,
      calculating a tolerant power level of the third period from the tolerant power level of the first period, and
      adding the remaining power level of the second period to the tolerant power level of the third period to calculate the remaining power level of the third period.

3. The method of claim 1, wherein the determining of the transmission power level of the third period comprises:
   determining a maximum transmission power level as one of a plurality of limit levels based on the results of the comparing, the plurality of limit levels corresponding to the plurality of reference levels, respectively; and
   determining the transmission power level of the third period as a lower one of the maximum transmission power level and the target power level.

4. The method of claim 3, wherein
   the plurality of reference levels comprise a first reference level and a second reference level which is higher than the first reference level,
   the plurality of limit levels comprise first and second limit levels, the first and second limit levels corresponding to the first and second reference levels, respectively, and
   the second limit level is equal to or more than the first limit level.

5. The method of claim 1, wherein the determining of the transmission power level of the third period comprises:
   determining a final backoff level as one of a plurality of backoff levels based on results of the comparing, the plurality of backoff levels corresponding to the plurality of reference levels, respectively; and
   subtracting the final backoff level from the target power level to determine the transmission power level of the third period.

6. The method of claim 5, wherein
   the plurality of reference levels comprise a first reference level and a second reference level which is higher than the first reference level,
   the plurality of backoff levels comprise first and second backoff levels, the first and second backoff levels corresponding to the first and second reference levels, respectively, and
   the second backoff level is equal to or less than the first backoff level.

7. The method of claim 1, wherein the generating of the power control signal comprises generating the power control signal so that a total power level which is used in a series of transmission signal units during the third period becomes equal to or less than the transmission power level of the third period.

8. The method of claim 7, wherein the generating of the power control signal comprises generating the power control signal so that the power level of the transmission signal unit becomes equal to or more than a minimum power level for maintaining a connection with the wireless communication device.

9. The method of claim 1, wherein the tolerant power level of the first period is determined based on a limit of a specific absorption rate (SAR).

10. A method of controlling transmission power used for wireless transmission in a wireless communication device, the method comprising:
    calculating a remaining power level of a third period based on a tolerant power level of a first period and a remaining power level of a second period, the third period included in the first period and being a period from a current time to a point in time following the current time, the second period being a period from the current time to a point in time preceding the current time, the tolerant power level being a total transmission power level available to the wireless communication device for the wireless transmission during a certain period;
    calculating a transmission power level of the third period based on a target power level and the remaining power level of the third period; and
    generating a power control signal for determining a power level of a transmission signal unit based on the transmission power level of the third period,
    wherein the first period is less than a sum of the second period and the third period, and
    the calculating of the remaining power level of the third period comprises,
       calculating a tolerant power level of the third period from the tolerant power level of the first period, and
       calculating the remaining power level of the third period so that the remaining power level of the third period becomes a sum of the tolerant power level of the third period and a value obtained by adjusting the remaining power level of the second period by a weight value.

11. The method of claim 1, further comprising:
calculating the remaining power level of the second period based on a tolerant power level of the first period and a transmission power level of the second period.

12. The method of claim 11, wherein
the second period comprises a plurality of sub-periods, each of the plurality of sub-periods corresponding to two or more transmission signal units, and
the calculating of the remaining power level of the second period further comprises calculating the remaining power level of the second period based on a plurality of partial remaining power levels corresponding to the plurality of sub-periods.

13. The method of claim 11, further comprising:
receiving a status signal generated in the wireless communication device, the status signal representing a status of the wireless communication device; and
adjusting the tolerant power level of the first period or the transmission power level of the second period based on information included in the status signal,
wherein the calculating of the remaining power level of the second period comprises calculating the remaining power level of the second period based on one of the adjusted tolerant power level of the first period and the adjusted transmission power level of the second period, and
wherein the calculating of the remaining power level of the third period comprises calculating the remaining power level of the third period based on one of the adjusted tolerant power level of the first period and the adjusted transmission power level of the second period.

14. The method of claim 13, wherein
the status signal comprises distance information generated by sensing a distance between the wireless communication device and a user, and
the adjusting of the tolerant power level of the first period or the transmission power level of the second period comprises adjusting the tolerant power level of the first period to be proportional to a distance represented by the distance information, or adjusting the transmission power level of the second period to be inversely proportional to the distance.

15. The method of claim 13, wherein
the status signal comprises direction information generated by sensing a direction of a user with respect to the wireless communication device, and
the adjusting of the tolerant power level of the first period or the transmission power level of the second period comprises adjusting the tolerant power level of the first period to be inversely proportional to a correlation between a direction represented by the direction information and beamforming, or adjusting the transmission power level of the second period to be proportional to the correlation.

16. The method of claim 13, wherein
the status signal comprises angle information generated by sensing an angle of the wireless communication device, and
the adjusting of the tolerant power level of the first period or the transmission power level of the second period comprises adjusting the tolerant power level of the first period to be inversely proportional to a correlation between an angle represented by the angle information and an angle of the wireless communication device being used, or adjusting the transmission power level of the second period to be proportional to the correlation.

17. The method of claim 13, wherein
the status signal comprises channel information about a communication channel, the communication channel established between the wireless communication device and another device in a wireless communication scheme, the communication channel being a channel different from an uplink channel and a downlink channel for the wireless transmission, and
the adjusting of the tolerant power level of the first period or the transmission power level of the second period comprises, downwardly adjusting the tolerant power level of the first period or upwardly adjusting the transmission power level of the second period when the channel information represents activation of the communication channel.

18. A method of controlling transmission power used for wireless transmission in a wireless communication device, the method comprising:
calculating, by a controller, remaining emission energy of a third period based on tolerant emission energy of a first period and used energy which was emitted for the wireless transmission during a second period, the third period included in the first period and being a period from a current time to a point in time following the current time, the second period being from the current time to a point in time preceding the current time, the tolerant emission energy being a total transmission energy available to the wireless communication device for the wireless transmission during a certain period;
calculating, by the controller, a transmission power level of the third period based on the remaining emission energy of the third period and a target power level of the third period; and
generating, by the controller, a power control signal for controlling a power level of a transmission signal unit based on the transmission power level,
wherein the calculating of the transmission power level of the third period comprises,
comparing the remaining power level of the third period with at least one of a plurality of reference levels, and
determining the transmission power level of the third period based on results of the comparing.

19. The method of claim 18, further comprising:
calculating the used energy from a cumulative power level which has been used to transmit a signal during the second period.

* * * * *